US010672530B2

(12) United States Patent
Ronay

(10) Patent No.: US 10,672,530 B2
(45) Date of Patent: *Jun. 2, 2020

(54) DEFORMABLE CONDUCTORS AND RELATED SENSORS, ANTENNAS AND MULTIPLEXED SYSTEMS

(71) Applicant: Liquid Wire Inc., Beaverton, OR (US)

(72) Inventor: Mark Ronay, Hillsboro, OR (US)

(73) Assignee: Liquid Wire Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,744

(22) Filed: Apr. 6, 2018

(65) Prior Publication Data

US 2018/0247727 A1    Aug. 30, 2018

Related U.S. Application Data

(63) Continuation-in-part of application No. PCT/US2017/019762, filed on Feb. 27, 2017.

(Continued)

(51) Int. Cl.
*H01B 1/00* (2006.01)
*C22C 28/00* (2006.01)
*H01B 1/16* (2006.01)
*H01Q 1/38* (2006.01)
*G01L 1/22* (2006.01)
(Continued)

(52) U.S. Cl.
CPC ............ *H01B 1/16* (2013.01); *C22C 28/00* (2013.01); *G01L 1/2212* (2013.01); *H01B 1/02* (2013.01); *H01Q 1/38* (2013.01); *H01Q 9/285* (2013.01); *H01Q 21/08* (2013.01)

(58) Field of Classification Search
CPC .............. H01B 1/00; H01B 1/02; C22C 28/00
See application file for complete search history.

(56) References Cited

U.S. PATENT DOCUMENTS 5,391,846 A    2/1995  Taylor et al.
5,478,978 A   12/1995  Taylor et al.
(Continued)

FOREIGN PATENT DOCUMENTS

EP       2058081 A2    5/2009
EP       2594987       5/2013
WO    WO2017151523    9/2017

OTHER PUBLICATIONS

Gao et al "Gallium-based thermal interface material with high compliance and wettability", Appl Phys A (2012) 107:701-708.*

(Continued)

*Primary Examiner* — Mark Kopec

(57) ABSTRACT

A conducting shear thinning gel composition and methods of making such a composition are disclosed. The conducting shear thinning gel composition includes a mixture of a eutectic gallium alloy and gallium oxide, wherein the mixture of eutectic gallium alloy and gallium oxide has a weight percentage (wt %) of between about 59.9% and about 99.9% eutectic gallium alloy, and a wt % of between about 0.1% and about 2.0% gallium oxide. Also disclosed are articles of manufacture, comprising the shear thinning gel composition, and methods of making article of manufacture having a shear thinning gel composition. Also disclosed are sensors and multiplexed systems utilizing deformable conductors.

5 Claims, 18 Drawing Sheets

Related U.S. Application Data

(60) Provisional application No. 62/301,622, filed on Feb. 29, 2016, provisional application No. 62/483,307, filed on Apr. 7, 2017, provisional application No. 62/483,309, filed on Apr. 7, 2017.

(51) Int. Cl.
  *H01B 1/02* (2006.01)
  *H01Q 21/08* (2006.01)
  *H01Q 9/28* (2006.01)

(56) References Cited

U.S. PATENT DOCUMENTS

| | | | |
|---|---|---|---|
| 5,792,236 A * | 8/1998 | Taylor | C22C 28/00 |
| | | | 141/64 |
| 7,854,173 B2 | 12/2010 | Cheng et al. | |
| 2014/0048749 A1 | 2/2014 | Locket et al. | |
| 2015/0270089 A1 | 9/2015 | Ghanea-Hercock | |
| 2016/0049227 A1 | 2/2016 | Bottiglio et al. | |
| 2016/0317992 A1 | 11/2016 | Thuo et al. | |
| 2018/0315518 A1 | 11/2018 | Ronay | |
| 2019/0092955 A1 * | 3/2019 | Tabor | C09D 11/52 |

OTHER PUBLICATIONS

Dickey et al "Eutectic Gallium-Indium (EGaIn): A Liquid Metal Alloy forthe Formation of Stable Structures in Microchannelsat Room Temperature", Adv. Funct. Mater. 2008, 18, 1097-1104.*
Zhang et al "Liquid Metal/Metal Oxide Frameworks", Adv. Funct. Mater. 2014, 24, 3799-3807.*
Kramer et al "Effect of microtextured surface topography on the wetting behavior of eutectic gallium-indium alloys", Langmuir 2014, 30, 533-539.*
Qin Xu, Nikolai Oudalov, Qiti Guo, Heinrich M. Jaeger, Eric Brown, "Effect of oxidation on the mechanical properties of liquid gallium and eutectic gallium-indium," Physics of Fluids, 24, 2012, pp. 063101-1to063101-13. (Year: 2012).
Kyle Doudrick, Shanliangzi Liu, Eva M. Mutunga, Kate L. Klein, Viraj Damle, Kripa K. Varanasi, and Konrad Rykaczewski, "Different Shades of Oxide: From Nanoscale Wetting Mechanisms to Contact Printing of Gallium-Based Liquid Metals", May 21, 2014, Langmuir 201430236867-6877, https://doi.org/10.1021/la5012023.
WO2017151523 Written Opinion of the ISA, dated May 29, 2017.
Extended European Search Report including Supplementary European Search Report and European Search Opinion, dated Jul. 19, 2019.
M. A. H. Khondoker and D. Sameoto, Fabrication methods and applications of microstructured gallium based liquid metal alloys, Aug. 8, 2016, Smart Mater. Struct. 25 093001.
Tingyi Liu, Prosenjit Sen, and Chang-Jin "CJ" Kim, Characterization of Nontoxic Liquid-Metal Alloy Galinstan for Applications in Microdevices, Apr. 2012, Journal of Microelectromechanical Systems, vol. 21, No. 2.
Douglas A. Litteken, Evaluation of Strain Measurement Devices for Inflatable Structures, Jan. 9, 2017, Proceedings of the 58th AIAA/ASCE/AHS/ASC Structures, Structural Dynamics, and Materials Conference 2017.
Junwen He, Ralph G. Nuzzo, and John A. Rogers, Inorganic Materials and Assembly Techniques for Flexible and Stretchable Electronics, Apr. 2015, Proceedings of the IEEE | vol. 103, No. 4.
Kamran Entesari and Alireza Pourghorban Saghati, Fluidics in Microwave Components, Jun. 2016, IEEE Microwave Magazine.
Yunxia Gao, Haiyan Li, Jing Liu, Direct Writing of Flexible Electronics through Room Temperature Liquid Metal Ink, Sep. 19, 2012, journal.pone.0045485.
Yigit Menguc, Yong-Lae Park, Ernesto Martinez-Villalpando, Patrick Aubin, Miriam Zisook, Leia Stirling, Robert J. Wood, Conor J. Walsh, Soft Wearable Motion Sensing Suit for Lower Limb Biomechanics Measurements, May 6, 2013, IEEE International Conference on Robotics and Automation (ICRA) Karlsruhe, Germany.
Arya Tabatabai, Andrew Fassler, Claire Usiak, and Carmel Majidi, Liquid-Phase Gallium-Indium Alloy Electronics with Microcontact Printing, Apr. 30, 2013, pubs.acs.org/Langmuir.
Michael D. Dickey, Emerging Applications of Liquid Metals Featuring Surface Oxides, Oct. 6, 2014, ACS Appl. Mater. Interfaces.
Yi Zheng, Zhizhu He, Yunxia Gao & Jing Liu, Direct Desktop Printed-Circuits-on-Paper Flexible Electronics, May 9, 2013, Scientific Reports | 3 : 1786 | DOI: 10.1038/srep01786.
Yi Zheng, Zhi-Zhu He, Jun Yang & Jing Liu, Personal electronics printing via tapping mode composite liquid metal ink delivery and adhesion mechanism, Apr. 4, 2014, Scientific Reports | 4 : 4588 | DOI: 10.1038/srep04588.
Agilent Technologies, Practical Strain Gage Measurements, 1999, Agilent Technologies Inc.
Eric Favini, Srikanthrao Agnihotra, Sumedh P Surwade, Christopher Niezrecki, David Willis, Julie Chen, Eugene Niemi, Kenneth Desabrais, Christine Charette and Sanjeev K Manohar, Sensing performance of electrically conductive fabrics and suspension lines for parachute systems, 2012, Journal of Intelligent Material Systems and Structures.
Faegheh Hoshyargar, Husnaa Khan, Kourosh Kalantar-Zadeh and Anthony P. O'Mullane, Generation of catalytically active materials from a liquid metal precursor, Jul. 29, 2015, Chem. Commun., 2015, 51, 14026.

* cited by examiner

A    B    C

Encapsulation such as thermoset polyurethane

DEFORMABLE CONDUCTORS AND RELATED SENSORS, ANTENNAS AND MULTIPLEXED SYSTEMS

CROSS-REFERENCE TO RELATED APPLICATIONS

This application is a continuation-in-part (CIP) of International Patent Application PCT/US2017/019762 filed Feb. 27, 2017 which is incorporated by reference and was published on Sep. 8, 2017 as International Publication No. WO 2017/151523 A1 which is incorporated by reference and which claims priority from U.S. Provisional Patent Application Ser. No. 62/301,622 filed Feb. 29, 2016 which is incorporated by reference. This application also claims priority from U.S. Provisional Patent Application Ser. No. 62/483,307 filed Apr. 7, 2017 which is incorporated by reference. This application also claims priority from U.S. Provisional Patent Application Ser. No. 62/483,309 filed Apr. 7, 2017 which is incorporated by reference.

TECHNICAL FIELD

Embodiments herein relate to liquid wire, and more specifically to liquid wire composed of a gallium indium alloy with integrated microstructures, and related sensors and multiplexed systems.

BACKGROUND

There is growing interest in incorporating electronics into everyday objects, including clothing and textile objects which are expected to be pliable, stretchable and soft. Soft electronics would be able to seamlessly interface with the human body, opening up many new applications for wearables, medical devices and the prospect of conformal robotics or 'soft machines' which could more safely interact with humans or delicate items (see, for example, Dickey, ACS Appl Mater Interfaces. 2014 Nov. 12; 6(21): 18369-18379).

Many non-traditional manufacturing methods are being considered to fabricate these soft electronic devices, notably 3D printing. However, a major stumbling block is the lack of a high conductivity and easily processed stretchable conductor.

Many attempts at stretchable conductors have been tried. One of the most successful has been microfluidic channels filled with room temperature liquid metal. Functional devices are created by etching micrometer channels into polydimethylsiloxane (PDMS), sealing them over and then injecting metals alloy into the channels to create conductive paths. These alloys can have a melting point as low as −19° C. and so remain fluid under normal conditions. Because the metal conductors are fluid, they can be deformed to an extent limited only by the material creating the channels containing them and recover fully. Further, their change in resistance is a purely mechanical function of the wire length and cross section and so is linear. This affords a major advantage of allowing conductive pathways to also act as sensors.

However. manufacturing devices with these microfluidic channels is very challenging. PDMS is the preferred substrate, but creating a proper seal around the channels is expensive, requiring exposure of the channel containing layer to oxygen plasma in order to adhere a cap layer to enclose the channel. Once constructed, the channels must be filled via a two syringe system, where one syringe injects the liquid alloy and another evacuates the air already present. Failure rates during construction are very high. Anecdotally it's been reported that only about one in twenty fabrication attempts succeeds. Thus, the need exist for other "liquid" metals.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION

Figure 1A:
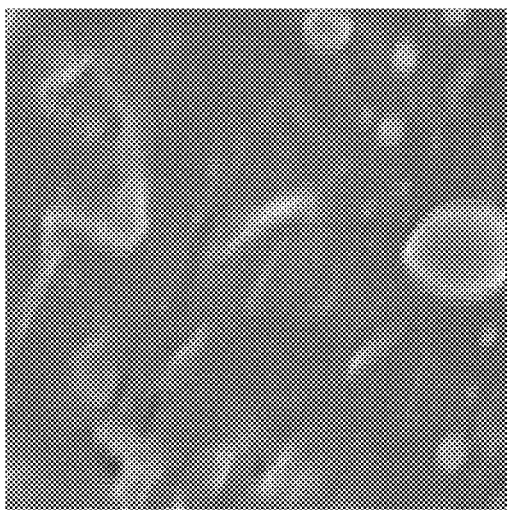
FIGS. 1A-1E are a digital image of a scanning electron microscope (SEM) images showing various gallium containing formulations, in accordance with various embodiments.

In the following detailed description, reference is made to the accompanying drawings that form a part hereof, and in which are shown by way of illustration embodiments that may be practiced. It is to be understood that other embodiments may be utilized and structural or logical changes may be made without departing from the spirit or scope of the present disclosure. Therefore, the following detailed description is not to be taken in a limiting sense, and the scope of embodiments is defined by the appended claims and their equivalents.

Unless otherwise explained, all technical and scientific terms used herein have the same meaning as commonly understood by one of ordinary skill in the art to which the disclosed subject matter belongs. Definitions of common terms in chemistry terms may be found in The McGraw-Hill Dictionary of Chemical Terms, 1985, and The Condensed Chemical Dictionary, 1981. Except as otherwise noted, the methods and techniques of the present disclosure are generally performed according to conventional methods well known in the art and as described in various general and more specific references that are cited and discussed throughout the present specification. See, e.g., Loudon, Organic Chemistry, Fourth Edition, New York: Oxford University Press, 2002, pp. 360-361, 1084-1085; Smith and March, March's Advanced Organic Chemistry: Reactions, Mechanisms, and Structure, Fifth Edition, Wiley-Interscience, 2001; or Vogel, A Textbook of Practical Organic Chemistry, Including Qualitative Organic Analysis, Fourth Edition, New York: Longman, 1978.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical with each other. "Coupled" may mean that two or more elements are in direct physical contact. However, "coupled" may also mean that two or more elements are not in direct contact with each other, but yet still cooperate or interact with each other.

As used herein, the singular terms "a," "an," and "the" include plural referents unless context clearly indicates otherwise. Similarly, the word "or" is intended to include "and" unless the context clearly indicates otherwise. Also, as used herein, the term "comprises" means "includes." Hence "comprising A or B" means including A, B, or A and B.

Except as otherwise noted, any quantitative values are approximate whether the word "about" or "approximately" or the like are stated or not. The materials, methods, and examples described herein are illustrative only and not intended to be limiting. Any molecular weight or molecular mass values are approximate and are provided only for description.

The description may use the terms "embodiment" or "embodiments," which may each refer to one or more of the same or different embodiments. Furthermore, the terms "comprising," "including," "having," and the like, as used with respect to embodiments, are synonymous.

A. Introduction

Flexible conductors are needed for numerous applications in electronics. Wearable devices, conforming sensors, flexible displays, soft robotic actuators and stretchable interconnects all require an electrically conductive medium able to both repeatably bend and stretch. Ideally a flexible conductor should provide no material resistance to the motion of a substrate it is adhered to while maintaining conduction through many cycles of stretching and flexing. A liquid conductor is ideally suited for this task.

As briefly touched on above, "liquid" metal conductors use eutectic alloys of gallium, usually mixed with indium and tin, which are embedded within microfluidic channels. Typically these alloys include: gallium-indium (usually 75% gallium, 25% indium) and gallium-indium-tin (most commonly 68.5% gallium, 21.5% indium, 10% tin). The gallium alloy fluids have low viscosities and high surface tensions. While these alloys may be good conductors, they have significant drawbacks that have hampered their widespread adoption. For example, the alloys themselves are difficult to process. In addition, the microfluidic channels are prone to leaking or failing irreversibly if the substrate the alloy is embedded in fatigues. Lastly, the alloys form an oxide layer on exposure to atmosphere, which is not conductive and can lead to failures at junctions between flexible wires and hard components. Thus, it would be an important advance to the art to provide a fluid that is easy to process, protected against oxidization, and has self-healing properties to allow functioning even as its substrate begins to wear. The current disclosure fulfils those needs.

Disclosed herein is a novel composite material discovered by the inventor that is composed of a gallium alloy and gallium oxide composition that includes distributed microstructures formed from the gallium oxide within the bulk gallium alloy. In embodiments the microstructures are formed from sheets of gallium-oxide that form on the surface of the bulk gallium to induce the distributed microstructure when mixed into the gallium alloy. The alloy is bound into a cross linked nanostructure of oxide ribbons, which serve a purpose similar to polymer gelling agents in common water based gels. The gel is stabilized using sub-micron scale particles to make a high viscosity, easily wettable and leak resistant Bingham Plastic (a fluid which evidences the properties of a solid until a shear force is applied) which can be consistently patterned onto most surfaces at room temperature. Once patterned the result is a high conductivity fluid interconnect which does not affect the material properties of its substrate. This gel is fluid at room temperature and has a freezing point at −5 centigrade. The end material has conductivities on the scale of $2-8*10^5$ S/m, depending on the degree of stabilization needed, and since it is relatively easy to pattern conductors up to 100 um thick the resulting sheet resistance is quite low compared to other flexible conductors. The disclosed composition generally forms a paste like material. The gallium oxide, in conjunction with a gallium alloy fluid, form micro and nano-structures. These structures can bear a small amount of force, depending on their geometry. By distributing a very large number of irregularly shaped micro and nano-structures composed of gallium oxide through the bulk of a gallium alloy fluid a new and novel composite fluid can be created, with high viscosity and non-Newtonian rheological properties. The fluid behaves similarly to a Bingham Plastic, holding structure until a stress is applied. As disclosed herein the creation and distribution of these micro and nano-structures can be achieved by multiple methods. In one embodiment, the creation and distribution of gallium oxide micro and nano-structures is achieved by coating nanoparticles and/or micro-particles in gallium-indium-tin enveloped in gallium oxide, and suspending them in a fluid of gallium-indium-tin through application of shear by means of shaking or mixing.

B. Overview of Several Embodiments

Aspects of the present disclosure relate to an electrically conductive compositions, for example with a paste like consistency, created by taking advantage of the structure provided by gallium oxide mixed into a eutectic gallium alloy in such a way as to provide micro or nano-structures capable of altering the bulk material properties of the eutectic gallium alloy. In some embodiments, the an electrically conductive compositions can be characterized as a conducting shear thinning gel composition, or a material having the properties of a Bingham plastic. In embodiments, a disclosed composition has a viscosity ranging from about 10,000,000 centipoise to about 40,000,000 centipoise under low shear and about 150 to 180 at high shear. For example under condition of low shear the composition has a viscosity of about 10,000,000 centipoise, about 15,000,000 centipoise, about 20,000,000 centipoise, about 25,000,000 centipoise, about 30,000,000 centipoise, about 45,000,000 centipoise, or about 40,000,000 centipoise under conditions of low shear. Under condition of high shear the composition has a viscosity of about 150 centipoise, about 155 centipoise, about 160 centipoise, 165 centipoise, about 170 centipoise, about 175 centipoise, or about 180 centipoise.

In embodiments, a disclosed composition includes a mixture of a eutectic gallium alloy and gallium oxide, wherein the mixture of eutectic gallium alloy and gallium oxide has a weight percentage (wt %) of between about 59.9% and about 99.9% eutectic gallium alloy, such as between about 67% and about 90%, and a wt % of between about 0.1% and about 2.0% gallium oxide such as between about 0.2 and about 1%. For example, a disclosed composition can have about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or greater, such as about 99.9% eutectic gallium alloy, and about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, and about 2.0% gallium oxide.

In embodiments, the eutectic gallium alloy can include gallium-indium or gallium-indium-tin in any ratio of elements. In certain embodiments, a eutectic gallium alloy includes gallium and indium. In certain embodiments a disclosed composition has percentage of gallium by weight in the gallium-indium alloy that is between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%.

In certain embodiments a disclosed composition has percentage of indium by weight in the gallium-indium alloy that is between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%.

In certain embodiments, a eutectic gallium alloy includes gallium and tin. In certain embodiments a disclosed composition has percentage of tin by weight in the alloy that is between about 0.001% and about 50%, such as about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50%.

In embodiments, one or more micro-particles or sub-micron scale particles are blended with the gallium alloy and gallium oxide. In embodiments, the particles are suspended, either coated in eutectic gallium alloy or gallium and encapsulated in gallium oxide or not coated in the previous manner, within eutectic gallium alloy fluid. These particles can range in size from nanometer to micrometer and can be suspended in gallium, gallium-indium alloy, or gallium-indium-tin alloy. Particle to alloy ratio can vary, in order to change fluid properties. In embodiments the micro and nano-structures are blended within the mixture through sonication or other mechanical means. In embodiments, a disclosed composition includes a colloidal suspension of micro and nano-structures within the gallium alloy/gallium oxide mixture.

In embodiments, as disclosed composition further includes one or more micro-particles or sub-micron scale particles dispersed within the mixture. This can be achieved by suspending particles, either coated in eutectic gallium alloy or gallium and encapsulated in gallium oxide or not coated in the previous manner, within eutectic gallium alloy fluid. These particles can range in size from nanometer to micrometer and can be suspended in gallium, gallium-indium alloy, or gallium-indium-tin alloy. Particle to alloy ratio can vary, in order to change fluid properties. In addition, the addition of any ancillary material to colloidal suspension or gallium alloy paste in order to enhance or modify its physical, electrical or thermal properties. The distribution of micro and nano-structures within eutectic gallium alloy can be achieved through sonication or other mechanical means without the addition of particles. In certain embodiments, the one or more micro-particles or sub-micron particles are blended with the mixture with wt % of between about 0.001% and about 40.0% of micro-particles, for example about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40.

In embodiments, the particles can be soda glass, silica, borosilicate glass, quartz, oxidized copper, silver coated copper, non-oxidized copper, tungsten, super saturated tin granules, glass, graphite, silver coated copper, such as silver coated copper spheres, and silver coated copper flakes, copper flakes, or copper spheres, or a combination thereof, or any other material that can be wetted by gallium. In some embodiments, the one or more micro-particles or sub-micron scale particles are in the shape of spheroids, rods, tubes, a flakes, plates, cubes, prismatic, pyramidal, cages, and dendrimers. In certain embodiments, the one or more micro-particles or sub-micron scale particles are in the size range of about 0.5 microns to about 60 microns, as about 0.5 microns, about 0.6 microns, about 0.7 microns, about 0.8 microns, about 0.9 microns, about 1 microns, about 1.5 microns, about 2 microns, about 3 microns, about 4 microns, about 5 microns, about 6 microns, about 7 microns, about 8 microns, about 9 microns, about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 31 microns, about 32 microns, about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, or about 60 microns.

Aspects of this disclosure further relate to methods of making a conducting shear thinning gel composition. In embodiments, the methods include blending surface oxides formed on a surface of a gallium alloy fluid into the bulk of the gallium alloy fluid by shear mixing of the surface oxide/alloy interface; and inducing a cross linked microstructure in the surface oxides; thereby forming a conducting shear thinning gel composition. In embodiments, a colloidal suspension of micro-structures is formed within the gallium alloy/gallium oxide mixture, for example as, gallium oxide particles and/or sheets.

In embodiments, the surface oxides are blended at a ratio of between about 59.9% (by weight) and about 99.9% eutectic gallium alloy, to about 0.1% (by weight) and about 2.0% gallium oxide. For example percentage by weight of gallium alloy blended with gallium oxide is about 60%, 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or greater, such as about 99.9% eutectic gallium alloy while the weight percentage of gallium oxide is about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, and about 2.0% gallium oxide. In embodiments, the eutectic gallium alloy can include gallium-indium or gallium-indium-tin in any ratio of elements. In certain embodiments, a eutectic gallium alloy includes gallium and indium. In certain embodiments the weight percentage of gallium in the gallium-indium alloy is between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%. In certain embodiments the weight percentage of indium in the gallium-indium alloy is between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%. In certain embodiments, a eutectic gallium alloy includes gallium, indium, and tin. In certain embodiments the weight percentage of tin in the gallium-indium-tin alloy is between about 0.001% and about 50%, such as about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50%.

In embodiments, one or more micro-particles or sub-micron scale particles are blended with the gallium alloy and gallium oxide. In certain embodiments, the one or more micro-particles or sub-micron particles are blended with the mixture with wt % of between about 0.001% and about 40.0% of micro-particles in the composition, for example about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40.

In embodiments the particles can be soda glass, silica, borosilicate glass, quartz, oxidized copper, silver coated copper, non-oxidized copper, tungsten, super saturated tin granules, glass, graphite, silver coated copper, such as silver coated copper spheres, and silver coated copper flakes, copper flakes or copper spheres or a combination thereof, or any other material that can be wetted by gallium. In some embodiments the one or more micro-particles or sub-micron scale particles are in the shape of spheroids, rods, tubes, a flakes, plates, cubes, prismatic, pyramidal, cages, and dendrimers. In certain embodiments, the one or more micro-particles or sub-micron scale particles are in the size range of about 0.5 microns to about 60 microns, as about 0.5 microns, about 0.6 microns, about 0.7 microns, about 0.8 microns, about 0.9 microns, about 1 microns, about 1.5 microns, about 2 microns, about 3 microns, about 4 microns, about 5 microns, about 6 microns, about 7 microns, about 8 microns, about 9 microns, about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 31 microns, about 32 microns, about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, or about 60 microns.

Aspect of the present disclosure related to articles of manufacture that includes a disclosed composition as well as methods of making such compositions. There is growing interest in incorporating electronics into everyday objects, including clothing and textile objects which are expected to be pliable, stretchable and soft. Soft electronics would be able to seamlessly interface with the human body, opening up many new applications for wearables, medical devices and the prospect of conformal robotics or 'soft machines' which could more safely interact with humans or delicate items.

In certain embodiments the article of manufacture comprises an electronic device. In certain embodiments the article of manufacture comprises a fabric, a plastic film and/or a membrane. In certain embodiments the disclosed compositions are integrated in sensors, for example sensors for us in detection strain and/or shear sensing. By way of example deforming liquid wire composed of a disclosed composition can create measurable changes in resistance, capacitance, inductance, impedance or characteristic frequency depending on the conductor geometry. For example the compositions can be used as sensors to detect strain and/or shear on any substrate. For example, a composition can be integrated into a 'geotextile' for use in reinforcing a berm or levy. In one such example, a long plastic encased wire made of a disclosed composition could detect slumping in the earthwork structure, giving an early warning of collapse. In another example a disclosed composition could be patterned onto parachute suspension lines to give real time strain feedback that could be used to control an automated steerable parachute.

In certain embodiments the article of manufacture comprises an article of bodywear comprising a base fabric; and one or more elements of the disclosed composition disposed thereon. In various embodiments, a base fabric, for example for body gear, is disclosed that may use one or more elements of the disclosed composition disposed thereon coupled to the surface of the base fabric, such as the outward or inward facing surface of a fabric. In an embodiment, the disclosed composition conducts electric current between various other elements of the garment, for example a power source, such as a battery and other integrated electronic devices, such as sensors.

In some embodiments, article of bodywear may include components for collecting information and/or processing the collected information, coupled to a disclosed composition. For example article of bodywear may include components monitoring one or more physical conditions of the wearer, such a body vital signs, for example as heart rate or EKG, pulse and temperature, and movement. In certain embodiments a disclosed composition is configured as a pressure sensor.

Generally, a sufficient surface area of the base fabric should be exposed to provide the desired base fabric function (e.g., stretch, drape, texture, breathability, moisture vapor transfer, air permeability, and/or wicking). For example, if there is too little exposed base fabric, properties such as moisture vapor transfer and/or air permeability may suffer, and even disproportionately to the percentage of coverage.

In embodiments, the electrically conductive compositions are in the range from about 0.1 mm in width to about 10.0 mm in width, such as about 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 mm (sometime greater) in width or any value or range within.

In certain embodiments, the amount electrically conductive composition and/or placement is selected to contain costs and create a material that is aesthetically pleasing. In embodiments, the electrically conductive compositions, has a thickness in the range from about 0.05, mm to about 5 mm thick, such as about 0.05, about 0.1, about 0.5, about 1.0, about 1.5, about 2.0, about 2.5, about 3.0, about 3.5, about 4.0, about 4.5, about 5.0, mm thick, or any value or range within, although lesser and greater thicknesses are also contemplated.

In accordance with various embodiments, the base fabric may be a part of any form of body gear, such as bodywear, blankets, tents, rain flys, umbrellas, or sun shade, or any material or apparatus. Bodywear, as used herein, includes anything worn on the body, such as, but not limited to, athletic wear such as compression garments, t-shirts, shorts, tights, sleeves, headbands and the like, outerwear, such as jackets, pants, leggings, shirts, hats, and the like, and footwear.

In various embodiments, the amount electrically conductive composition and/or placement may be disposed on a base fabric having one or more desired properties or characteristics. For example, the base fabric may have properties such as air permeability, moisture vapor transfer, and/or wickability, which are common needs for bodywear used in both indoor and outdoor applications. In some embodiments, the base fabric may have other desirable attributes, such as abrasion resistance, anti-static properties, anti-microbial activity, water repellence, flame repellence, hydrophilicity, hydrophobicity, wind resistance, solar protection, SPF protection, resiliency, stain resistance, wrinkle resistance, and the like. In other embodiments, separations between the amount electrically conductive compositions may help allow the base fabric to have a desired drape, look, and/or texture. Suitable base fabrics may include nylon, polyester, rayon, cotton, spandex, wool, silk, or a blend thereof, or any other material having a desired look, feel, weight, thickness, weave, texture, or other desired property.

In various embodiments, single-layer of base fabric may be used comprising the base fabric, whereas other embodiments may use multiple layers of fabric, including a layer of the base fabric, coupled to one or more other layers.

In various embodiments, the placement, pattern the amount electrically conductive composition may vary. In various embodiments, the pattern of the amount electrically conductive composition and/or placement may be symmetrical, ordered, random, and/or asymmetrical.

Aspects of this disclosure further relate to methods of making an article of manufacture having a shear thinning gel composition as disclosed above. In such methods, the shear thinning gel composition is printed onto at least one surface of the article of manufacture.

In certain embodiments, a disclosed composition is printed or otherwise transferred to substrate. In some embodiments, printing comprises screen printing. In some examples printing is done by contact transfer, for example using 3D printing stamp molds cast is silicone rubber and/or polyurethane rubber stamps. A parameter in transfer contacts is the surface energy of the material to be transferred, the contact pad and the substrate. A fluid will generally wet to a surface with higher energy than its own surface energy and preferentially wet to a substrate with a yet higher energy. Silicone rubbers (PDMS) have unusually low surface energies and are often used as the transfer agent in contact transfer printing. In other embodiments, a disclosed composition is transferred to a substrate using a saturated sponge is pressed through a mask to transfer material. A number of polyurethane and PDMS foams are available which are for the sponge methods.

The subject matter of the present disclosure is further illustrated by the following non-limiting Examples.

EXAMPLE

Example 1

Method of Material Formation

Initially working with a commercially available gallium-indium-tin (68.5, 21.5, 10) alloy (Galistan), it was observed that gallium based alloys form oxide layers very quickly in atmosphere. During the process of injecting the liquid metal into PDMS microfluidic channels, Hydrochloric Acid (HCL) was being used to reduce oxide layers on samples to reduce waste and allow 'clean' non-oxidized devices to be built. In the course of this process it was observed that sample exhibited strange physical behavior when being reduced by HCL. For example it did not form regular Galistan, but rather made a viscous material. The material was harvestable in small quantities from my commercially obtained Galistan samples.

An initial attempt was made to synthesize a material similar to foam from Galinstan by blending in 30 micron glass beads. In the presence of oxygen galinstan wetted readily to glass via its oxide layer. It was initially hoped that it would 'wet' to glass beads in this manner and a slurry of Galinstan and glass would be formed in this way, which might be high viscosity and easily formed into arbitrary shapes.

It had previously been reported that the only mechanism by which gallium-indium and related alloys wets to any non-metallic surface is through the adhesion of its oxide layer and the resultant trapping of the fluid under that layer. It was the hypothesis that gallium-indium-tin would wet in such a manner to the beads, with a thin layer of fluid metal directly in contact with the glass, trapped in place by an oxide layer. Through mixing the glass beads would come repeatedly in contact with atmosphere, forming successive layers of oxide trapping successive layers of gallium-indium-tin. When these structures were resubmerged, shear forces from the mixing were expected to cause the oxide layers to break and form dispersed structure, allowing a colloidal suspension of the glass beads and upping the viscosity of the fluid.

This method worked well with 30 micron beads and a variety of other sizes. This led to the discovery that any fine network of interlinked gallium-oxide structure would absorb gallium-indium alloy and would provide an internal structure to the fluid which would increase viscosity. With a higher viscosity the fluid would be more easily extrudable and could be reliably formed into conducting geometries using traditional printing techniques such as nozzle deposition or stenciled printing. The resulting high viscosity fluid is referred to variously as Gallium-Indium Gel, Gallium-Indium alloy Gel, Metal Gel or simply Gel.

Example 2

Addition Method of Material Formation

First, microstructures of gallium oxide were created by sonicating gallium-indium-tin which was wetted onto a plane of glass. The sonication caused microstructures to form on the gallium-oxide surface. Successive sonication and mixing sessions blended these structures into the bulk of the fluid, eventually resulting in a gel consisting of gallium-indium-tin and approximately 0.84% oxide. This gel was less prone to separation than that made with glass beads and has a naturally much higher bulk conductivity. Interestingly, hydrochloric acid, often used to reduce the oxide on gallium alloys, reduces only the surface oxide on gel produced in this manner, leaving the internal structure intact. This contrast with gel made with glass beads, which is fully reduced by HCL, causing a complete separation of the beads from the gel and a lowering of viscosity.

Example 3

Addition Method of Material Formation

A third successful technique involved using a mixing bar partially submerged in a bath of gallium-indium or gallium-indium-tin and rotating at very high RPM in order to create a vortex. A vortex created in such a way causes thin unstable walls of gallium-indium and its oxide layer to form around the mixing bar, extending multiple centimeters above the fluid level. Due to these walls the vortex has a high surface area and sublimates a large amount of oxide into the fluid. The fluid quickly increases in viscosity, necessitating orbital mixing. The resulting fluid is not homogenous, gallium-indium Gel floats on the surface, due to blended in air bubbles, while low viscosity gallium-indium alloy forms a pool on the bottom. The Gel can be drained by placing it on an incline, then gathered and vacuum cycled to pull out the air. The resulting gel is comparable to that produced through sonication.

Example 4

Creation of Stamp Transferable Compositions

Both Gallium and Indium are expensive. Their conductivity is adequate, but much lower than copper or silver ($3.46 \times 10^6$ S/m compared to $58.5 \times 10^6$ S/m for copper). It was thought to be desirable to create a suspension of additives in the gel both to decrease cost and increase conductivity. Multiple additives were attempted.

Both microsphere and flake gels are resistant to displacement when pressure is applied during encapsulation by adhesives or thermoplastic welding.

An innovation was that both flake and pure copper loaded gels become stamp transferable. A regular letter press stamp can be coated with the gel+additive material and then pressed against a suitable substrate, and the pattern on the stamp will be transferred with high fidelity. Features as small as 0.5 mm were created in this manner, with pitches as small as 0.25 mm. Such depositions were extremely thin, about 25 micometers.

Example 5

Creation of Stamp Transferable Compositions

Macro contact printing has been tried, up to now without success for other gallium containing liquids. For stamp lithography, attempts to transfer a solid line and filled rectangle onto an elastomer substrate using both flat stamps and textured stamps have also been tried without success. Although this transfer method is similar to existing approaches in the past other groups were not successful in extending this technique to liquid-phase GaIn alloy. For example Galinstan does not wet the elastomer in some regions and coalesces into droplets in others. In the case of the textured stamp, droplets deposited by each dimple do not coalesce uniformly. This uneven wetting may result from non-uniform wetting during "inking", when the stamp is initially coated with Galinstan, or from non-uniform contact pressures during transfer.

These problems were overcome with the disclosed compositions by mixing low micron and nanoscale particles into the gallium alloy/oxide gel. While not being bound by theory, it is believed the added particles stick to the oxide structures and do not float free in the gallium metal. The reinforce the oxide, ensures it breaks in larger chunks and generally constrains flow in the system. Perhaps more importantly, when a rupture does occur the flow of metal likely picks up the added particles+oxide and carries it along, which impedes the free flow. There is also likely an interaction between gallium, indium or tin and the silver or copper in some of the metallic particles used which may form unstable intermetallics, which create further fine structure in the fluid, impeding its free flow.

Several loading schemes were tried for each additive. All were mechanically mixed at a steady addition rate into pre-prepared gel. Loading as high as 54% was attempted, though higher loadings of metal causes hardening of the resulting mixture through an unknown process (likely formation of alloys or intermetallics).

Figure 1B:
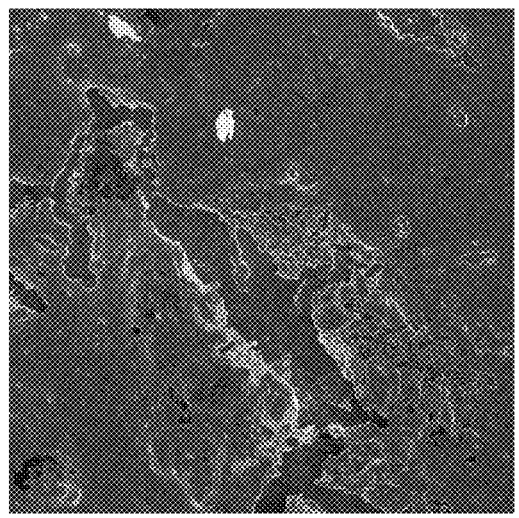
Figure 1C:
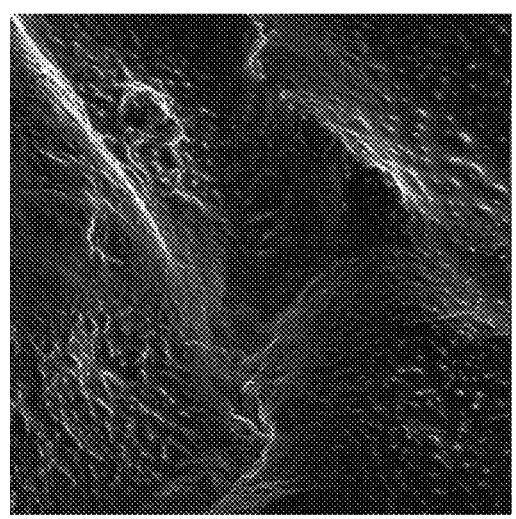
Figure 1D:
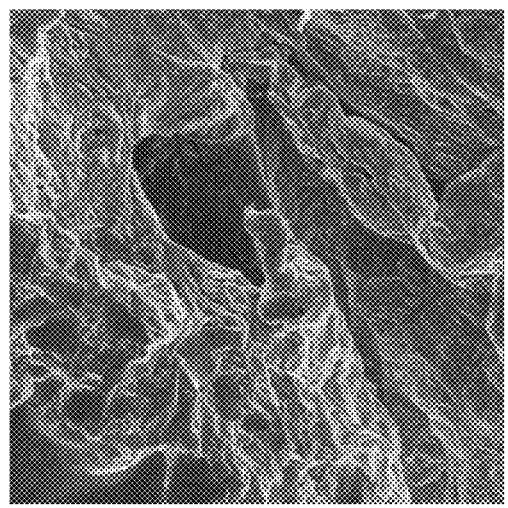
Figure 1E:
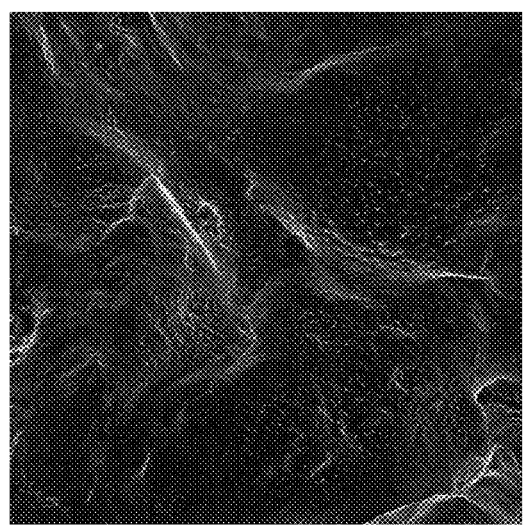

It was found that loadings of silver coated copper flake between 10-30% by weight created a composite material with a consistency similar to clay that spread into very uniform flat sheets when deposited with a spatula or brush. Scanning electron microscope (SEM) images showed sheets of deposited material to be uniform in height to a remarkable though not yet precisely measured degree (See FIGS. 1A-1E). FIG. 1A shows regular unprocessed gallium-indium-tin (note it is blurry because it has a very low viscosity and so is vibrating due to the electron beam impacting. FIG. 1B shows a micron scale flake stabilized gel (image 500 microns across), FIG. 1C shows unstabilized gel (90 microns across), FIG. 1D shows unstabalized gel whipped into a standing shape, to show its semi-solid properties (75 microns across), FIG. 1E unstabalized gel (250 microns view).

Once encapsulated, sheets appear fluid and will stretch and reform under the forces of their encapsulating channel. Copper microspheres or flakes, loaded at 10-30% weight creates a more viscous fluid, becoming somewhat solid and crumbly near the upper range of loading.

To test compressibility new formulations were pressed between layers of 'rescue tape' a self adhering PDMS substrate available commercially, and they were checked the uniformity of the flow due to compression.

Figure 2A:
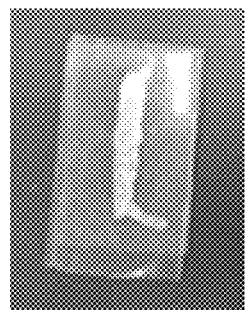
FIGS. 2A-2C are digital images of unsuccessful (A, B) and successful (C) compression tests, in accordance with various embodiments.
Figure 2B:
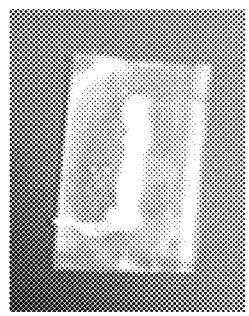
Figure 2C:
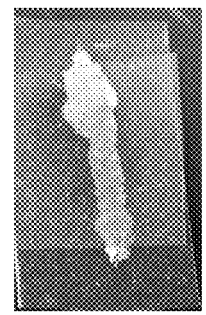
Figure 3:
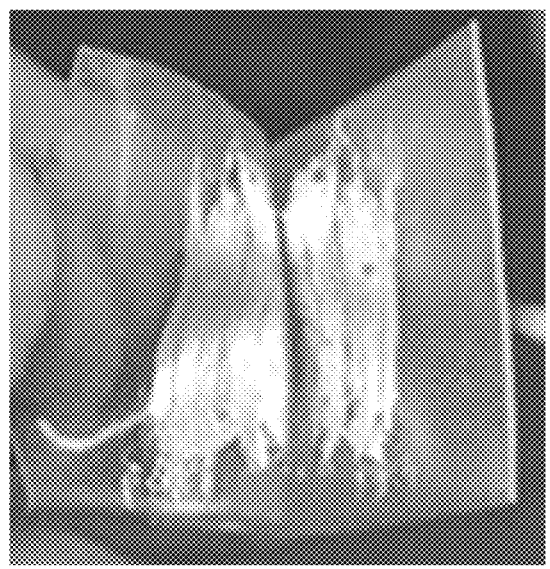
FIG. 3 is a digital image Initial observation of high fidelity contact transfer of metal gel patterns.
Figure 4A:
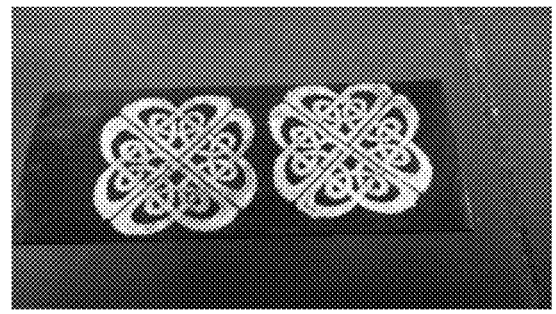
FIGS. 4A-4D are digital images of test contact transfer patterns with particle loaded metal gel. Patterns have trace widths as fine as 0.5 mm and pitches as fine as 0.25 mm, in accordance with various embodiments.
Figure 4B:
Figure 4C:
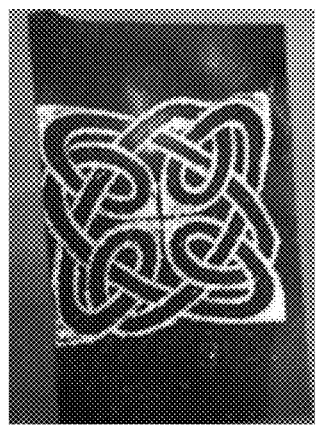
Figure 4D:
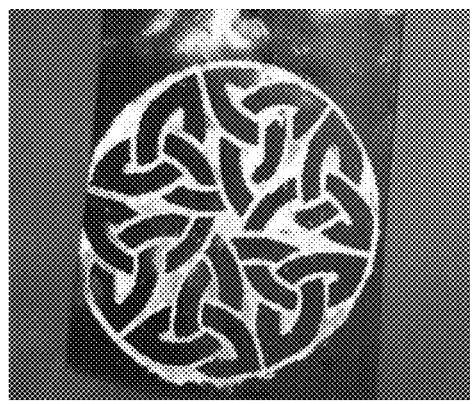

FIGS. 2A and B show unsuccessful (A, B) and successful (C compression tests side by side. Note the 'sprues' jetting off the main body of the unsuccessful compressions. These are caused by unrestrained flow of gallium metal which is moving separately from the composite system. In contrast, the particle additive loading in the successful test is such that the system must flow together and spreads evenly on compression. This is very desirable for encapsulating the conducting gel using established industrial techniques such as thermowelding plastic films around a deposited pattern. In the course of carrying out these compression tests it was observed that patterns were transferred between the substrates with very high fidelity when peeled apart (see FIG. 3)

To further test the promising contact printing techniques a 'celtic knot' pattern art stamp was used that had a variety of trace widths, pitches and patterns. FIGS. 4A-4D show the initial trials with that stamp produced excellent results. Patterns with trace widths as fine as 0.5 mm and pitches as fine as 0.25 mm.

Figure 5:
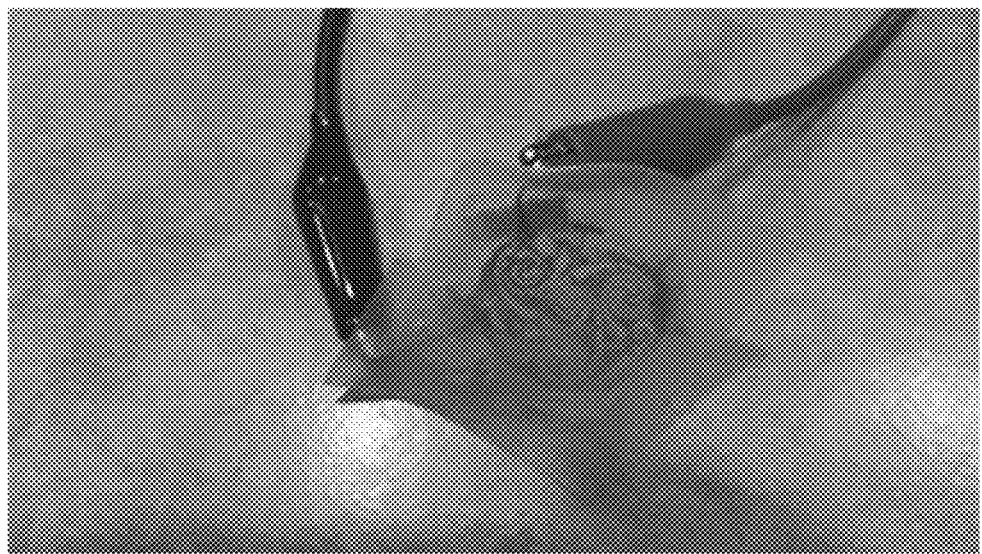
FIG. 5 is a digital image of a patterned pressure sensor, in accordance with various embodiments.

The transfer process was highly dependent on how much metal gel is loaded onto the stamp initially, how even the substrate and stamp are and how much pressure is applied With these techniques, useful devices can be made with stamp transferring. FIG. 5 shows an encapsulated stamp, with leads attached. This configuration acts as a pressure sensor. When pressure is applied the pattern deflects and compresses, changing its resistance measurably. With a higher fidelity transfer printing process and customized trace patterns this could be a very cheap and very useful pressure sensor. Total build time was approximately 1 minute by hand, including lead attachment and potting. This manufacture process is very scalable and allows the quick patterning of arbitrary trace geometries in two dimensions.

Example 6

Strain Sensing with Eutectic Metal Gels

The disclosed formulations enable large scale strain and deformation sensing through use of eutectic metal gel composite materials that can be printed in a manner similar to an ink or paint onto a variety of substrates in order to create conductive traces. Because the disclosed material are an amorphous room temperature fluid, they can be deformed and stretched without fatiguing. A thin trace laid down on a plastic fabric liner can flex and stretch without affecting the feel of the fabric. Encapsulating such a trace with a second layer of fabric liner will create a sealed conductive pathway. These applications have already been demonstrated for use in strain sensors and for non-sensing low profile and stretchable wires for smart sports clothing.

Figure 6:
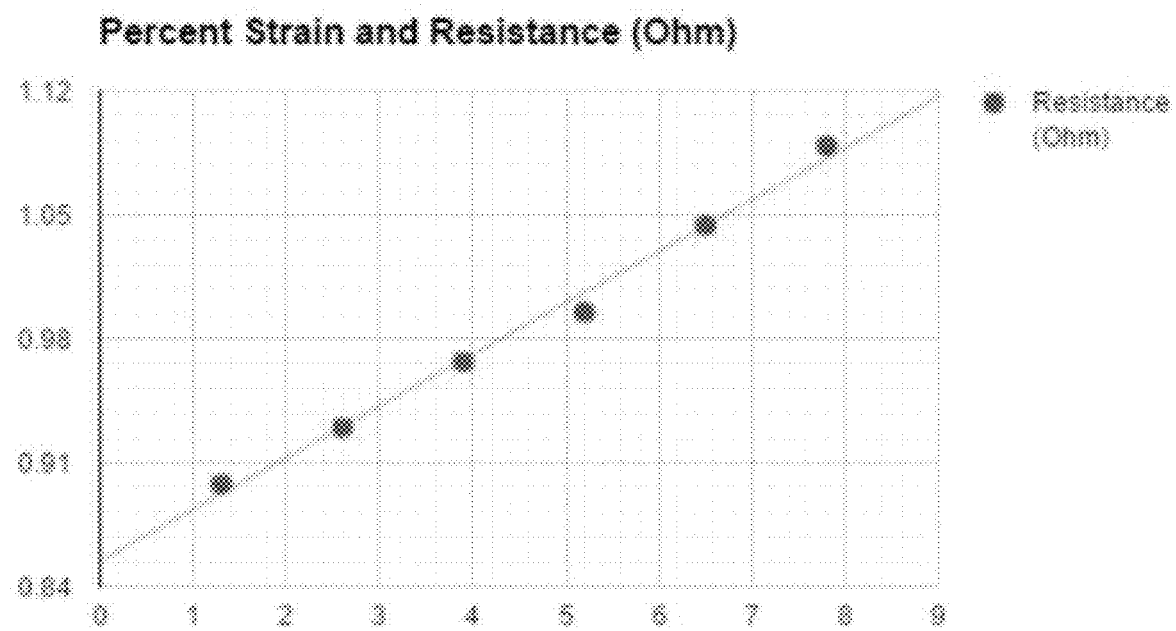
FIG. 6 is a graph of a strain test of an 8" trace of Metal Gel encapsulated in silicone, showing the linearity of resistance relative to degree of strain.

The amorphous metal structure of the disclosed materials provides that when stretched or otherwise deformed there is linear resistance change which can be used for sensing (see FIG. 6). When patterned onto a parachute canopy and integrated with a Wheatstone bridge and an Analog to Digital Converter, resistance changes can be used to measure dynamic forces and strains during parachute deployment.

Figure 7:
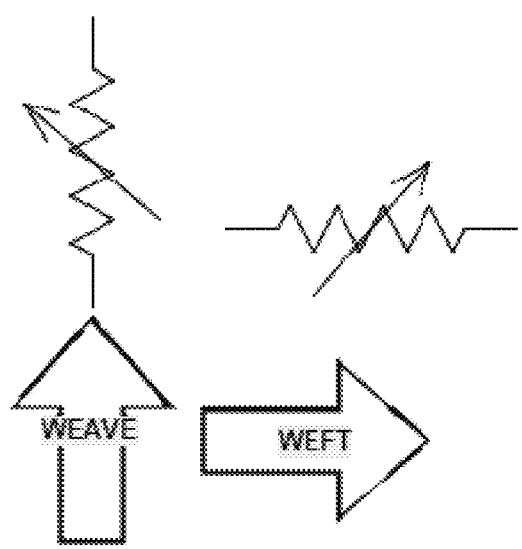
FIG. 7 is an illustration of variable resistors oriented to change due to strain along either weave or weft orientations.

Any segment of metal gel wire will serve as a variable conductor the variance of which will be a function of strain parallel to the conductor. This allows a large number of strain sensing patterns to be built, with various resolutions. In the simplest case two traces could be patterned onto each gore on a parachute, one traveling in the weft direction and one traveling in the weave direction (see FIG. 7). By measuring conduction changes on both, a strain profile for the individual parachute gore can be drawn. With correct patterning certain portions of traces can have a disproportionately high linear resistance change in response to strain. A zigzag pattern for example will show disproportionately high resistance change if strained in an axis perpendicular to the path of the trace. Using this feature, multiple traces could be built along a gore with appropriate patterning over an area of interest for gaining strain information. This would increase the resolution of strain sensing over the gore and allow a complete strain map to be extrapolated.

Figure 8:
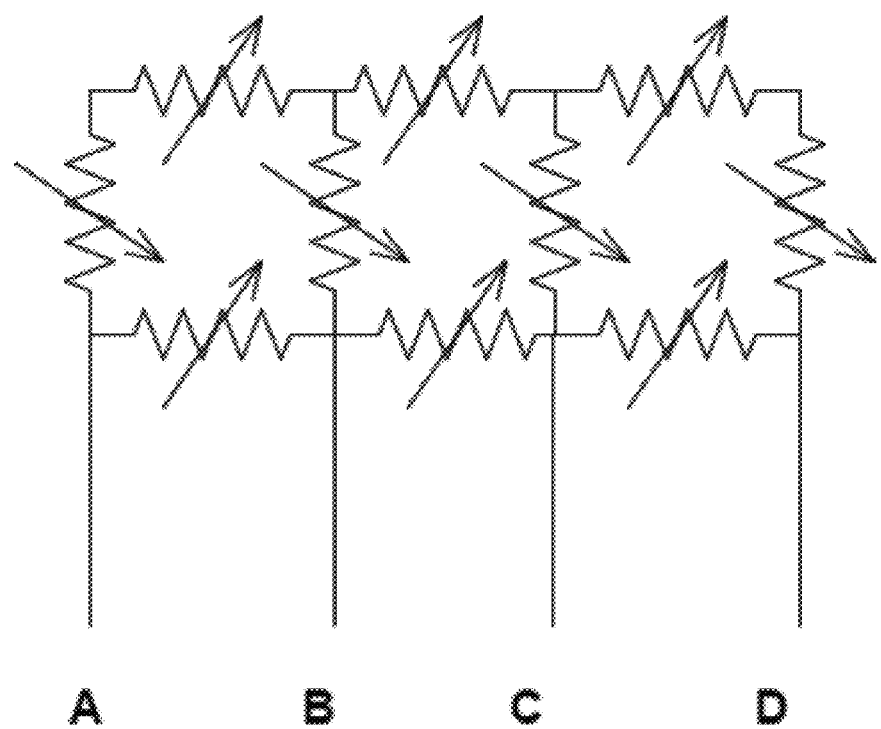
FIG. 8 is a simple 1×3 grid with 10 variable resistors and a four analogue output elements, A, B, C, D. All unique pairings of output elements create a 6 element vector. By properly weighting the resistance ranges of each variable resistor we can ensure the output vector uniquely encodes every possible combination of resistances to an arbitrary fidelity.

A very high resolution could be achieved by building a mesh of interconnecting metal gel traces. Each segment of the mesh would be a variable resistor dependent on strain in either the weft or weave direction depending on its orientation. All unique pairings of output elements create a 6 element vector. By properly weighting the resistance ranges of each variable resistor it can be ensured that the output vector uniquely encodes every possible combination of resistances to an arbitrary fidelity (see, for example FIG. 8).

Solving for resistance values in a connected mesh of variable resistors based on a finite i/o vector is a well understood problem often encountered in the field of VLSI design and validation. Using techniques already developed, a mapping of resistance values to i/o vector resistance values can be developed which would allow fast and effective reading of strain at every segment of the parachute canopy surface which is traversed by a conductive gel segment. With this method resolutions better than 1 square cm could be achieved.

Retrieving Data

Because metal gel acts exactly as a metal, electrical signals can be transmitted out either through a wired connection made of a metal gel trace running down a suspension line, or via broadcast. Each gore could have sewn on a small embedded system which reads out resistor values and feeds them into a standard broadcast format. These signals could be fed into metal gel antennas printed on the canopy surface (see FIG. 9). The antennas can be stretched, changing its operating frequency, however such changes are linear and can be matched for. A pattern of antennas broadcasting unique ID's could also provide low resolution strain maps of the canopy surface. s In any of the above methods strain would be measured directly on the canopy surface, without the need for external sources of illumination or remote detection. This would enable not only high resolution measurement of the strain field without the computational overhead of image processing, but also field deployable systems that would not be sensitive to variable light levels, adverse weather or payload/canopy misalignment.

Validation Current Metal Gel Patterning and Encapsulation Techniques for Parachute Canopy Fabric.

The objective is to adhere to the nylon material of a parachute canopy. It is not anticipated that a thin TPU trace or silicone adhesive will negatively affect the underlying material. However tensile strength and fatigue tests are done to ensure there is no negative effect. Assessment is performed for direct application of silicone based adhesives, such as Dow Corning 7091 to parachute fabric and subsequent patterning of metal gel onto the cured sealant and adhesion of TPU encapsulated metal gel traces to the canopy fabric.

Characterization of Metal Gel Traces on Parachute Canopy Fabric

Strain testing on encapsulated metal gel traces to parachute fabric is performed to measure strain resistance feedback relationship in weft and weave directions. A variety of standard trace patterns in weave and weft orientations will be measured through the desired strain ranges of 0.2-25%. Characterized eutectic metal gel variable resistor values will be used.

Use Output of Characterization to Model 2 Dimensional Variable Resistor Strain Sensing Using commercial simulation tools such as MatLab and LabView multiple 2 dimensional strain gauge topologies will be modeled. Of particular interest are variable resistor mesh networks. By simulating these networks with real values derived as described below will generate a mapping of the high dimensional surface network of coupled linear variable resistors to an output vector that can take on a continuous range of values. Such a mapping will be stored in a lookup table that can be used for interpreting variable resistor network outputs in larger scale experimentation.

Characterize Small Scale Parachute with Variable Resistor Topology in Wind Tunnel A small scale parachute, single gored and under 3 feet, will be patterned with two eutectic metal gel strain sensors, one for weft direction and one for weave. System will be deployed in a wind tunnel and results characterized.

Iteration of Wind Tunnel Testing with Increasing Sensor Resolution.

Increasingly high resolution sensing networks on a simple parachute will be built, tested and validated with earlier tests. Data from strain sensor canopies will be used to validate output data from a four sensor test, which will in turn be used to validate data from incrementally more complex and high resolution patterns.

Validate Current Metal Gel Patterning and Encapsulation Techniques for Parachute Canopy Fabric Variable resistor traces will be prepared inside TPU films. We will adhere these films to swatches of parachute canopy material measuring approximately one foot by three inches. In addition, Silicone adhesive, such as Dow Corning 7091 adhesive/sealant will be directly applied to parachute canopy, metal gel will be patterned onto the adhesive and a second encapsulating layer will be laid down. The output of this task will be best practices for depositing metal gel on parachute canopy material.

Characterization of Metal Gel Traces on Parachute Canopy Fabric

The above prepared swatches will be fatigued for 350 cycles and strained to failure in an Instron 3365. Results will be compared to control swatches of canopy fabric without metal gel traces in order to assure that the canopy fabric is not adversely affected. On conclusion of these tests more involved characterization of strain/resistance relationships will be done for different trace geometries. We will characterize the Gauge Factor (GF), for a $L_s$=0.5 Meter swatch of canopy fabric with integrated metal gel trace in both the weft and weave direction by measuring normalized change in resistance $\Delta R_s/R_s$ versus strain, $\varepsilon=\Delta L_s/L_s$, where:

$$GF = \frac{\frac{\Delta R_S}{R_{SO}}}{\varepsilon}$$

To obtain the data to compute GF, canopy material swatches with integrated strain sensing traces will be mounted on an Instron 3365 testing machine outfitted with a 2 kN Load Cell and a LVDT to measure the displacement $\Delta L_s$. Quasi static strain tests will take place at strains of 0-20% in 0.25% steps. Dynamic strain tests will be taken over the range of 0-20% for 350 cycles on each sample. Displacement data will be collected in Labview for all tests.

The change in resistance, $\Delta R_s$, is measured using a Wheatstone bridge, which generates an analog output voltage, $V_o$, which is a function of the change in resistance at its input. In our application the input "strain" resistance is given by $R_s=V_s/I_s$, where two metal gel wires' of length $L_s$, have resistances $R_{s1}$ and $R_{s2}$, These two wires represent the two conductors in strain sensing topologies such as shown in FIG. 10A-10D. The analog output voltage, $V_o$, is converted to digital data by using a National Instruments ADC (Analog to Digital Converter) for analysis in Labview where it will be converted into $R_s$ data. The ADC has a target spatial resolution sufficient to detect a 0.25% change in voltage with a sampling rate of 1000 Hz. The ratio of the change in resistance $\Delta R_s$ to the nominal zero strain resistance $R_{so}$ divided by the strain, ε, gives GF. In practice attaching this system to a microcontroller will produce a real time dynamic view of strain during parachute deployment. During this task multiple conductive patterns will be tested both in weft and weave orientations. These patterns will include trace widths of 1-4 mm in 0.5 mm increments in various geometries.

Construction of Gauge Factor Model for Simulation

Using the GFs measured, a simulation model will be created in either MatLab or LabView. This model will consist of a catalogue of variable resistors with strain percentages as the input and resistance changes appropriate to the metal gel pattern as the output. This catalogue of known and characterized metal gel traces will be used below.

Model Multiple 2 Dimensional Variable Resistor Strain Sensing

Using MatLab or Labview, circuit simulations will be built for various topologies of variable resistors. Using the catalogue of variable resistor models generated, accurate simulations of canopy fabric strain can be run by changing values on a simulated variable resistor network. Using these simulations, new topologies can be designed and tested in order to achieve high resolution designs. Of particular interest will be variable resistor grid patterns, as these are easy to build with a high density of strain sensors. However, we will not rule out other unconnected or sparsely connected variable resistor networks for high resolution sensing. The output of this task will be a set of modeled patterns which can be laid on prototype canopy systems.

Characterize Small Scale Parachute with Variable Resistor Topology in Wind Tunnel A small parachute will be purchased and two metal gel traces will be attached on one gore. One will be in the weft direction, one in the weave direction. These traces will be wired directly to a Wheatstone bridge to ADC circuit attached to a computer running LabView for real time recording of strain results. The set up will then be deployed in a tunnel. Real time data will be taken as the parachute is deployed in the wind tunnel.

Iteration of Wind Tunnel Testing with Increasing Sensor Resolution.

Using data collected above as validation, two additional higher resolution patterns will be tested. These patterns will be based on simulation and will serve to validate the model. It is anticipated that one pattern will be a grid of variable resistors with an output vector as described in FIG. 8. The other pattern will be an unconnected network of trace geometries spanning the parachute surface that multiply the output provide higher resolution by having an independent weft and weave spanning trace over multiple portions of the canopy surface with dedicated i/o lines such that deciphering strain feedback will be trivial.

Example 7

Application to a Nylon Fiber Parachute Suspension Cord

Direct application of eutectic metal gel to a nylon fiber parachute suspension cord can be done at room temperature with no intermediary chemical processing necessary. A flexible and stretchable binding agent, such as 2 part polyurethane resin or silicone elastomer could be used to permanently encapsulate the gel against the nylon cord and prevent any displacement during normal handling and packing of the parachute suspension and control line systems. It is expected that this process will leave the ultimate tensile strength and flexibility of the parachute line unchanged.

Importantly, the amorphous metal structure of disclosed compositions ensure that when stretched or otherwise deformed there is linear and repeatable resistance change which can be used for sensing. When patterned into a standard parachute cord such as PIA-C-5040 and integrated with a Wheatstone bridge, with an Analog to Digital Converter, these linear and repeatable resistance changes can be used to measure dynamic forces and strains during parachute deployment.

Tests have been done to demonstrate the feasibility of coating an inner cord from a MIL-C-5040H parachute line. The metal gel achieved good wetting to the nylon and created a low resistance trace while adding negligible weight.

The resistance of Liquid Wire conductors can be engineered by adjusting thickness and width to be on the order of 1 to 100 ohms per meter, which is ideal for applications requiring resistance to be measured vs. stretch, since the resistance value is high enough to give a good signal to noise ratios in a Wheatstone bridge. Higher resistances, such as for CNT based conductive coatings, result in very small currents that are easily corrupted by electromagnetic interference (EMI). Similarly copper has such a low resistance value that the voltage drop over a few meters of line is too small to be practical, and also suffers from EMI issues. Typical resistance values for a line with dimensions of a MIL-C-5040H control line measuring 6 feet in length coated with metal gel are between 2 to 20 Ohms depending on deposition thickness.

Representative changes in conductivity can be seen in FIG. 6 which shows the strain response for a metal gel wire encapsulated in a silicone rubber. Testing was carried out using an adjustable jig capable of stretching the sample in 1.5 mm steps and a ESR meter to accurately measure the sub 1 Ohm resistance of the sample during the quasi-static strain test.

Figure 11:
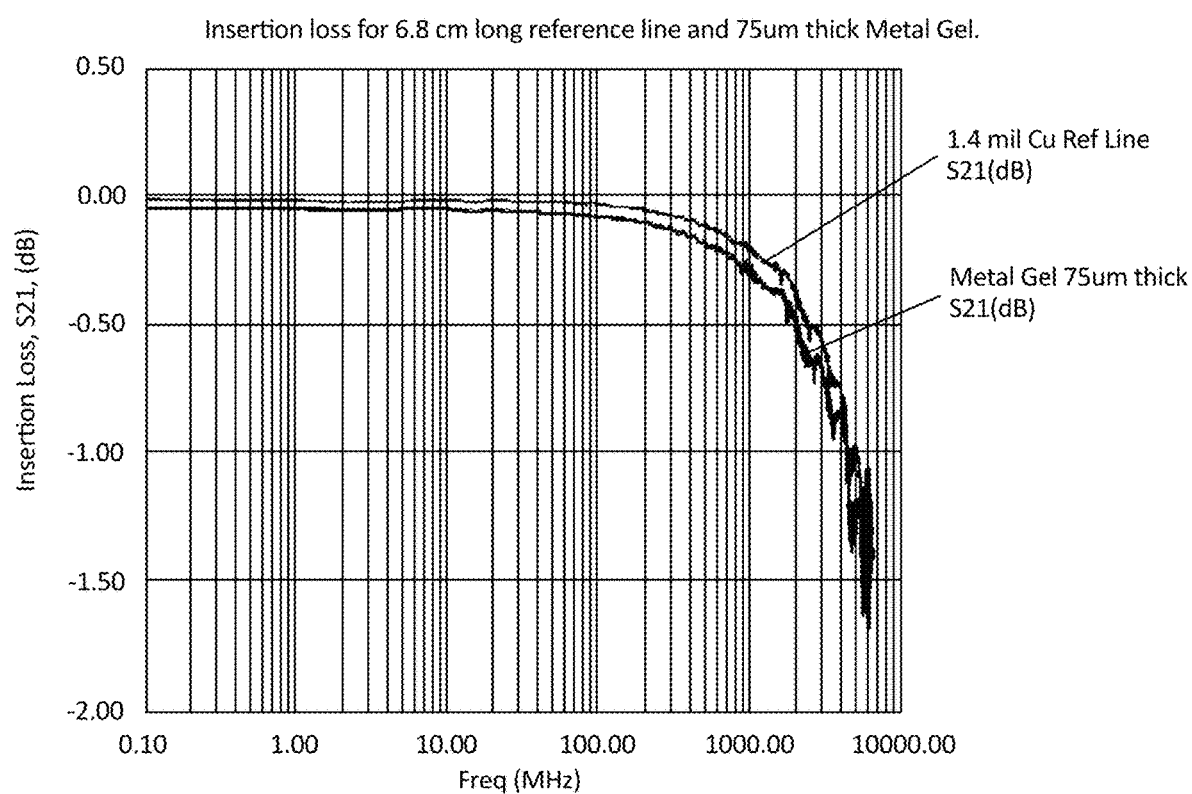
FIG. 11 is a graph of a measured insertion loss to 6 GHz for of 1.4 mil (35 um) thick Cu reference trace and a 75 um thick metal gel line. Insertion loss rises for both materials from skin effect.

Although not as conductive as copper, metal gel based conductors are still viable for sending high speed data. Testing of flat traces intended for clothing have shown that the material is suitable for transmission of signals up to at least 6 GHz, allowing interconnects to be directly incorporated into off the shelf radio frequency or microwave frequency transmission systems. FIG. 11 shows measured insertion loss for a 50 ohm microstrip line made of copper versus metal gel. Other solutions using organic conductors can have several kilo-ohms of resistance, making them impractical for carrying RF signals more than a few inches.

Testing Metal Gel Gauge Factor for Strain Sensing

The Gage Factor (GF) of a 0.5 meter nylon cord with integrated metal gel trace will be characterized for axial strain sensing. This is accomplished by measuring the normalized change in resistance ($\Delta R/R$) versus strain ($\Delta L/L$), RF Signal Carrying Capability The goal of this objective is to test different types of transmission lines made out of metal gel to characterize their RF signal carrying capability. This will include controlling the transmission line characteristic impedance. The transmission lines will be designed to be compatible with the standard parachute line cord form factor.

Electromagnetic Interference (EMI) Shielding

To prevent EMI from being radiated by the metal gel lines (Radiated Emission), or received by them (Radiated Susceptibility) some sort of conductive shield will likely need to be used. This shield will surround the metal gel lines either completely or perhaps only partially. The objective is to test the feasibility of using carbon black loaded polyurethane or silicone, or metal gel as a shielding layer laid over an insulator coating an inner conductor, or conductors, made of metal gel.

Effect of Eutectic Metal Gel and Encapsulation on Suspension Line Durability

Parachute lines should have their flexibility and durability substantially unaltered by the addition of a eutectic metal gel. Ultimate tensile strength of the coated lines will be measured and compared to uncoated versions. Likewise, the conductive metal gel coating should be able to stand up to the same requirements of flexibility and durability the suspension lines are held to. For this reason dynamic strain feedback will be tested by placing repeated strain on the line through 350 cycles. The objective is to see no failure on the part of the conductor or the parachute suspension line.

Application of Metal Gels to PIA-C-5040 Parachute Lines

In this task known deposition techniques used for planar surfaces such as found in clothing textiles will be applied and modified as needed to the cylindrical surfaces of nylon inner cords from standard parachute suspension lines. The subsequent encapsulation of the coated cords will be done using both silicone and two part polyurethane. In addition, known methods for encapsulating metal gel in TPU films will be used to create large, extremely flexible, stretchable and low profile strain sensors that can be adhered to the outside of nylon control lines or in between core and sleeve cords in parachute suspension and control lines. This approach would have the added bonus of being applicable to parachute canopy material as well, since the same low profile TPU encapsulated interconnects could be adhered to the control lines and the canopy. Some possible methods are shown in FIGS. 12A-12D. After assessing techniques it is anticipated a total of four types strain sensing parachute lines will be made: One with an un-encapsulated coating on all eight of the inner cords with the sheath providing encapsulation (FIG. 12B), one with two polyurethane encapsulated metal gel coated nylon inner cords providing an outgoing and return signal line (FIG. 12C), one with the same arrangement encapsulated in silicone rubber, and one with a separate TPU sensing ribbon running the length of the parachute line (FIG. 12D). Multiple lines of each type may be built to facilitate testing.

Tensile Strength and Strain Range Testing

PIA-C-5040 parachute lines with integrated strain sensing traces will be mounted on an Instron 3364 testing machine outfitted with a 5 kN Load Cell and strained until their failure point. Tests will be compared to stock parachute lines without integrated strain sensing traces. The linear range of the strain feedback from the conductive traces will be assessed over the total elongation, from 0% to failure (anticipated at 30%). Data will be generated on the impact of techniques on ultimate tensile strength of the parachute lines.

Metal Gel Gauge Factor for S Train Sensing

The goal of this task is to characterize the Gauge Factor, GF, for a $L_s=0.5$ meter nylon cord with integrated metal gel trace for strain sensing by measuring the normalized change in resistance $\Delta R_s/R_s$ versus strain, $\varepsilon=\Delta L_s/L_s$, where:

$$GF = \frac{\frac{\Delta R_S}{R_{SO}}}{\varepsilon}.$$

To obtain the data to compute GF parachute lines with integrated strain sensing traces will be mounted on an Instron 3365 testing machine outfitted with a 2 kN Load Cell and a LVDT to measure the displacement $\Delta L_s$. Quasi static strain tests will take place at strains of 0-20% in 0.25% steps. Dynamic strain tests will be taken over the range of 0-20% for 350 cycles on each sample. Displacement data will be collected in Labview for all tests. The change in resistance, $\Delta R_s$, is measured using a Wheatstone bridge, which generates an analog output voltage, $V_o$, which is a function of the change in resistance at its input. In our application the input "strain" resistance is given by $R_s=V_s/I_s$ as shown in FIG. 13, where two metal gel wires' of length $L_s$, have resistances $R_{s1}$ and $R_{s2}$. These two wires represent the two conductors in strain sensing topologies such as shown in FIGS. 12C and D. The analog output voltage, $V_o$, is converted to digital data by using a National Instruments ADC (Analog to Digital Converter) for analysis in Labview where it will be converted into $R_s$ data. The ADC has a target spatial resolution sufficient to detect a 0.25% change in voltage with a sampling rate of 1000 Hz. The ratio of the change in resistance $\Delta R_s$ to the nominal zero strain resistance R so divided by the strain, $\varepsilon$, gives GF. In practice attaching this system to a microcontroller will produce a real time dynamic view of strain during parachute deployment.

RF Signal Carrying Capability.

This task will demonstrate transmission of RF signals along the metal gel strain sense lines. In FIG. 11 preliminary data show that the insertion loss of RF signals in a microstrip line made of metal gel is not significantly worse than copper through at least 6 GHz. We will expand on this learning by designing transmission line structures that are compatible with standard parachute line form factor. To allow RF signals to be transmitted along the metal gel strain sense wires a system as shown in FIG. 14 will be constructed. This is similar to the block diagram in FIG. 13, except that a diplexer is added to allow the dc current Is to flow through an inductor $L_d$ to allow $R_{s1}$ and $R_{s2}$ to be measured, while the capacitor $C_d$ acts as a DC block and allow RF signals to enter the loop from an RF data source as shown. The inductor prevents the RF signal from being short circuited, and at the far end of the loop the RF signal exits the loop through capacitors $C_1$ and $C_2$. For transmission of RF signals along an interconnect system a controlled characteristic impedance is desired. To control the impedance it is proposed that interconnect schemes such as those shown in FIG. 15A-C be evaluated. The second design (B) uses a pair of close spaced conductors (3) to create a "twin lead" interconnect having an impedance on the order of 100 to 300 ohms. The exact impedance is a function of the metal gel dimensions, the spacing the lines, and the dielectric constant of the encapsulation material. The third design (C) is similar to (B), except that outer shield (4) is added to allow lower impedance values and reduce radiation and EMI. Test structures will be simulated and measured to characterize their insertion loss and characteristic impedance versus frequency. Results of the simulation and finished transmission line design will be the output of this task.

EMI Shielding

A proof of concept transmission line, or lines, will be fabricated in which a signal line will be jacketed in an envelope of conductive material impregnated rubber in order to provide EMI shielding, such as shown in FIGS. 15A and C. The feasibility of using carbon black loaded polyurethane or silicone will be tested, as well as a shielding layer of metal gel laid over an insulating encapsulation coating an inner layer of sensing/transmission gel. Simulations will be performed using a 3D electromagnetic simulator such as ANSYS HFSS to model the behavior. Data from the simulations and prototype lines will be the output of this task.

Embedded System Design

A prototype embedded system will be designed and built for reading out variable resistor values and converting them to strain percentages which can be sent out via SPI or I2C for processing elsewhere. A Wheatstone bridge designed to produce variable voltage ranging from 250 mV to 2500 mV will be integrated onto a board with a 12 bit ADC, a low power microcontroller and a power supply. Design and construction of a prototype board does not involve any unknown science or novel engineering and should take approximately two months, depending on turnaround with an assembly contractor. Programming of the embedded system is expected to take another month. Raw voltage values from the Wheatstone bridge read through the ADC will need to be converted to strain percentages based on experiments run which will have provided the appropriate GF. A less certain challenge will be the packaging design for robustly interfacing metal gel conductors with contacts on the board. The conductive line running the length of the parachute cord will need to be contacted with a solid metal in such a way that the metal gel trace remains hermetically sealed so as to prevent displacement or contamination of the metal gel. We view the most likely packaging method to succeed will be splicing brass wires into the variable resistance transmission lines at their terminus, sealing the junction with a potting agent and then soldering the wires into terminals on the PCB. By using wires of sufficient length to have some slack, and sewing them into a ripstop fabric at the parachute suspension line terminus we believe enough strain can be limited from the junction to allow it to operate through multiple deployments. The finished system can be validated by mounting the parachute line in the Instron 3364 and imposing precise and known strains upon the line while reading data out of the embedded system. The outcome of this task will be a finished prototype of a parachute suspension line with metal gel enabled strain sensing attached to an embedded system which can generate data out in the form of strain percentage over either SPI or I2C data lines.

EMI Shielding Prototyping and Testing

Prototype lines consisting of a shielding layer of either metal gel or carbon black impregnated elastomer and of sensing/transmission gel so as to create a coaxial cable or shielded bifilar line, as shown in FIGS. 15A and C respectively, will be physically tested. Both systems will be tested as transmission lines and their radiated emissions will be tested either by using the anechoic chamber.

Figure 12:
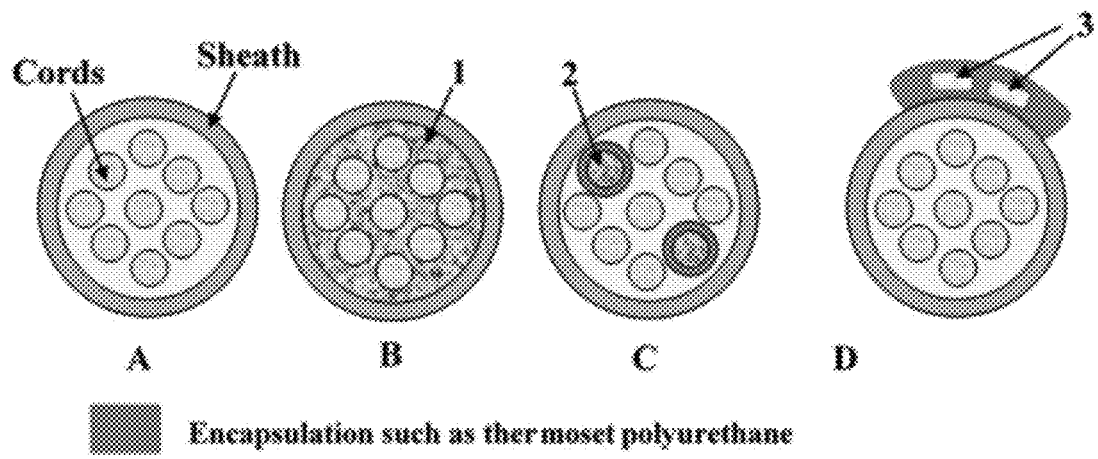
FIGS. 12A-12D is set of schematics showing encapsulation of parachute line 12A) Standard parachute line with multiple cords surrounded by a sheath. 12B) Metal gel (1) is encased with nylon cords in the sheath creating a single conductor. 12 C) To create multiple conductors in a single parachute line individual inner nylon cords may be coated with metal gel and encapsulated in an insulator such as a thermoset polyurethane. 12D) Alternatively multiple metal gel conductors (3) can be encased in thermoplastic polyurethane and adhered to the outside of the parachute line sheath.
Figure 13:
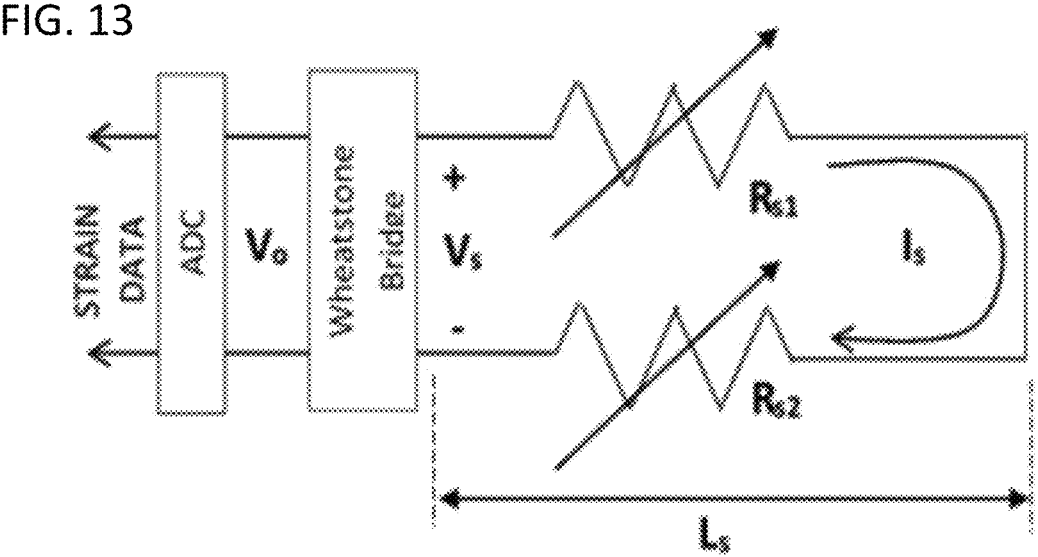
FIG. 13 is a block diagram of the basic strain sensor using a pair of metal gel wires of length $L_s$. The two wires have a combined resistance of $R_s=R_{s1}+R_{s2}=V_s/I_s$, where $V_s$ and $I_s$ are the dc voltage and current at the Wheatstone bridge sense port. The Wheatstone bridge has an output $V_o$, which is proportional to $R_s$, which is fed into an ADC to create a digital strain data output.
Figure 14:
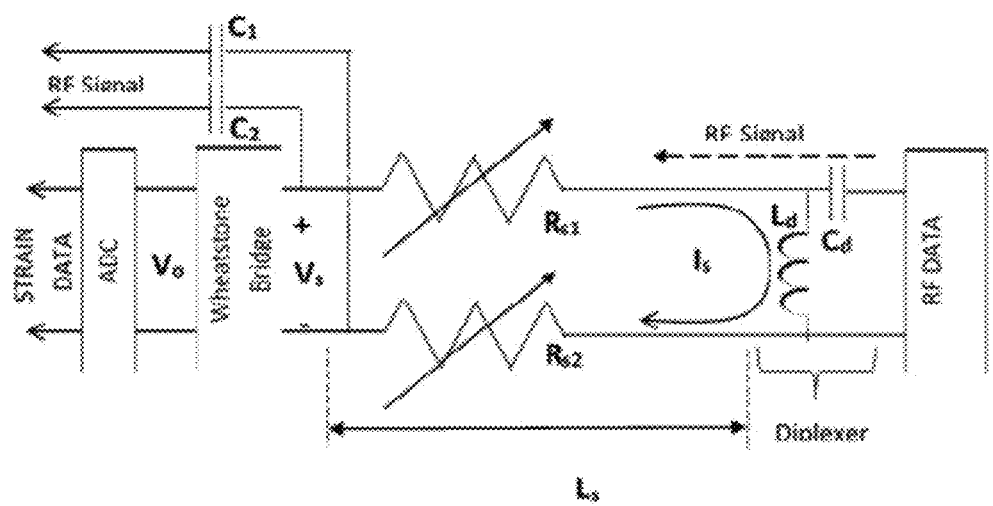
FIG. 14 is a block diagram showing how a diplexer allows the DC current, $I_s$, to flow through the strain sensor loop via $L_d$, while the RF signal is coupled by $C_d$ into the loop and removed by $C_1$ and $C_2$. The inductor $L_d$ also prevents the RF signal from being short circuited.
Figure 15:
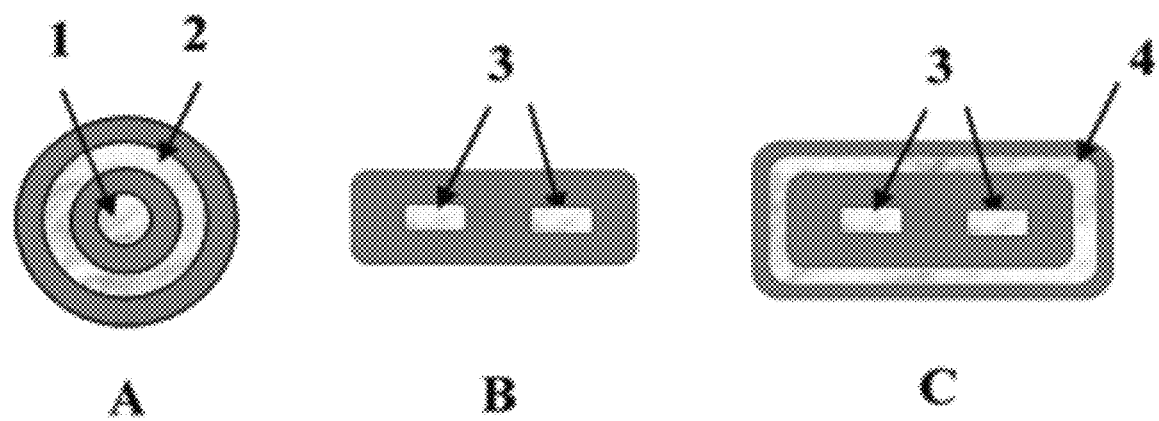
FIGS. 15A-15C are three methods of creating controlled impedance transmission lines using metal gel. 15A) A coaxial interconnect with a metal gel center (1) conductor (that could even be a coated nylon cord) surrounded by an insulating encapsulation layer and a metal gel outer layer (2) with a final outer encapsulation layer to stabilize the structure. 15B) Two metal gel lines in a "twin lead" (also called "bifilar") arrangement. 15C) An outer metal gel layer applied to the structure in (15B) to allow lower impedances, which also reduces radiation and shields the two lines from electromagnetic interference (EMI). The first design (15A) has an outer conductor of metal gel (2) applied around the insulated center conductor (1) to create a coaxial transmission line having an impedance of the range of 30 to 100 ohms.
Figure 15:

By their very nature the strain gauges shown in FIGS. 13 and 14 may have some immunity to EMI if the two interconnects are in close proximity, such as shown in FIGS. 12 C and D. This is because closely spaced interconnects tend to experience the same electromagnetic interference resulting in "common mode" noise. The current flows in opposite directions in each interconnect so the circuit operates in a "differential mode." This means that the common mode noise currents cancel at the Wheatstone bridge input. Further immunity to EMI can be achieved by adding an outer conductor such as show in FIGS. 15 A and C.

Sensing Applications of Deformable Conductors

With conventional systems, it is difficult to measure the compression of arbitrarily shaped compressive materials such as air balloons/pockets, compressible gel or foam cushions, or other soft goods. Many systems for performing compression measurements are intrusive and change the fundamental function of the compressive system. For example, in a system in which biofeedback is needed, or it is desired to measure the compression of an item vis a vis a body—such as in the case of a wearable object like a shoe, a brace or some article of clothing—it is not currently possible to have a testing apparatus in situ while the object is being used as intended.

Likewise, in a complex system with multiple constituent parts such as a shoe, a tire, or a gasketed joint in a machine or piping system or other such apparatus, it may be possible to measure compressive or other strain response performance of certain parts of the apparatus in isolation with specialized testing equipment. However, it is very difficult to measure the holistic performance of the apparatus where compressive or other strains upon the part in question are affected by the apparatus as a whole, rather than a separate piece of test equipment. In such a case a non-intrusive and in situ measurement device would be desirable.

Some of the inventive principles of this patent disclosure relate to the use of deformable conductors to electrically sense deformations in an elastic or soft material or composite object made of multiple materials any one of which may be expected to compress, stretch, experience shear or otherwise deform. An embodiment of a sensing system according to the inventive principles of this patent disclosure may include two parts: the material of which the compression, elongation, shear or other deformation is to be sensed; and a patterned stretchable/flexible conductor which does not appreciably affect the material properties of its substrate and along which electrical signals can be sent. By patterning the conductor into particular geometries on the material and attaching it to a source of electric power or signals, characteristic electrical properties, such as capacitance, inductance or impedance may be utilized to sense the deformation of the material. Because the conductor is deformable, e.g., flexible, stretchable, etc., it can be repeatedly deformed in such as a way that the above characteristic electrical properties change in a manner which may typically be linear and a predictable function of the deformation. Such deformable circuits with preferably linearly changing characteristic electrical properties can be implemented with multiple differing geometries which perform substantially similar end functions by differing electrical means.

Inductive Sensing:

in some embodiments according to the inventive principles of this patent disclosure, a compression sensor may include two opposed inductive coils, one on either side of the material where compression is expected. Their mutual inductance can be measured with external circuitry and change as they are moved closer to one another due to compression. An array of such coils may be arranged to provide a view of a compression field.

Capacitive Sensing:

in some embodiments according to the inventive principles of this patent disclosure, two parallel plates of conductive material may be patterned in a geometry such that a change in capacitance is different for a shear or a compression force. For example, two parallel plates shaped as Ts which directly overlap experience a large change in capacitance as shear is applied parallel with either stem of the T but experience a relatively small change in capacitance if compressed so that the two opposing T's are brought closer together. By varying the widths of the stems it is possible to distinguish shear in either direction of the plain in which the pattern is embedded. Specialized geometries may provide optimum performance on differing surfaces or be particularly sensitive to particular patterns of strain and shear.

Impedance Sensing:

in some embodiments according to the inventive principles of this patent disclosure, an AC or RF signal sent along patterns of deformable conductors may be utilized to measure changes in the characteristic impedance, frequency response, etc., of a transmission line, antenna, or other device fabricated from the deformable conductors, thereby providing information on the deformation. The measurements may be obtained through direct reading of an electrical line, through reading the near field radiated by an electrically active pattern, by measuring the far field radiated by an electrically active pattern, etc.

Inductive Pattern Sensing:

in some embodiments according to the inventive principles of this patent disclosure, a system for sensing compression/shear/strain or other deformation can include individually addressable inductive spiral pairs separated by a gap of deformable material and transmitting a unique ID via short range wireless signals (e.g., near field communication NFC)). By triangulating the signals over the grid of inductive traces a very high resolution image of deformation can be made.

An array of inductive coils or other radiating patterns may act as short range wireless devices or in a manner similar to RFID antennas. Such patterns may be powered by an external field, allowing them to operate without a local power source. Likewise, such a field may be "illuminated" by a broadcasting antenna or other EMF source and the reflected near or far field signals may be detected by an external device. In such a way compression or other strain sensing patterns may be incorporated directly into an object without the need for an interconnect which may negatively affect the performance of the object. Such a pattern may be an antenna operating in microwave or other radio frequency bands.

Figure 16:
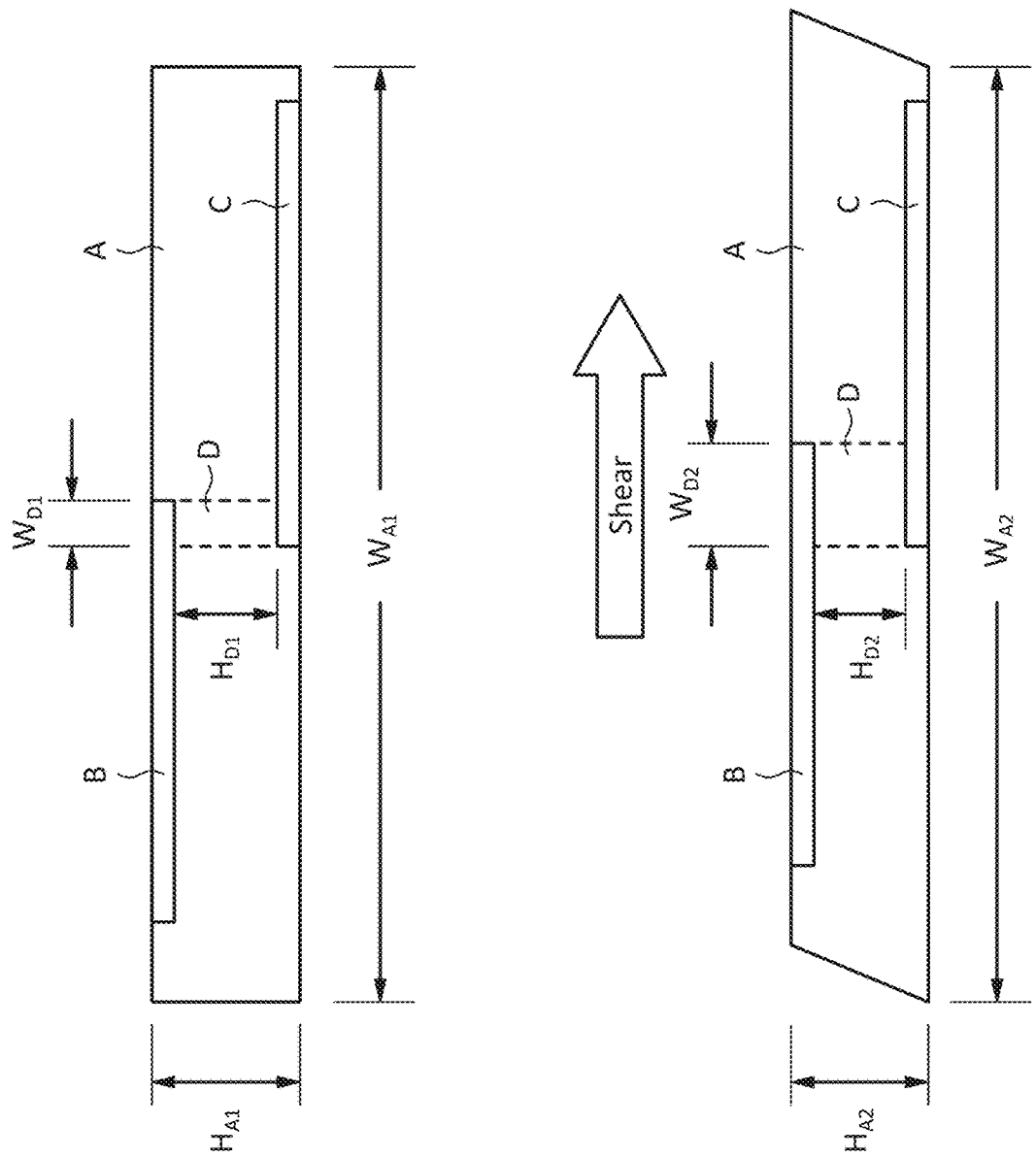
FIG. 16 is a cross-sectional view illustrating an embodiment of a device for capacitively sensing shear according to the inventive principles of this patent disclosure.

FIG. 16 is a cross-sectional view illustrating an embodiment of a device for capacitively sensing shear according to the inventive principles of this patent disclosure. The embodiment of FIG. 16 includes an elastic substrate A shown in the undeformed state at the top of the drawing. A floating transmission line B made from a deformable conductor is patterned on one side of the substrate, and a fixed in place return line/ground C is made from a deformable conductor is patterned on the opposite side of the substrate. In this example, the substrate in the relaxed state may have a thickness $H_{A1}$ of about 1/16th inch and width $W_{A1}$ of about one inch, but other dimensions may be used. The overlap between the two conductors creates an E-field region D having a height $H_{D1}$ and width $W_{D1}$ when the substrate is in the relaxed state. Thus, the capacitance between the floating transmission line B and the return line C is determined by the height $H_{D1}$ and width $W_{D1}$ of the region D as well as the dielectric constant of the substrate.

When the substrate A is subjected to a shear force as shown by the arrow, it deforms in such a way that the overlap between the floating transmission line B and the return line C increases, thereby causing the width of the E-field region D to increase from $W_{D1}$ to $W_{D2}$. Depending on the amount of shear, the height of the substrate A may also decrease to $H_{A2}$, thereby causing the height of region D to decrease from $H_{D1}$ to $H_{D2}$. This change in the geometry of the E-field region D causes an increase in the capacitance between the floating transmission line B and the return line C which may be sensed by any suitable electronics, thereby enabling the embodiment of FIG. 16 to function as a shear sensor.

Figure 17:
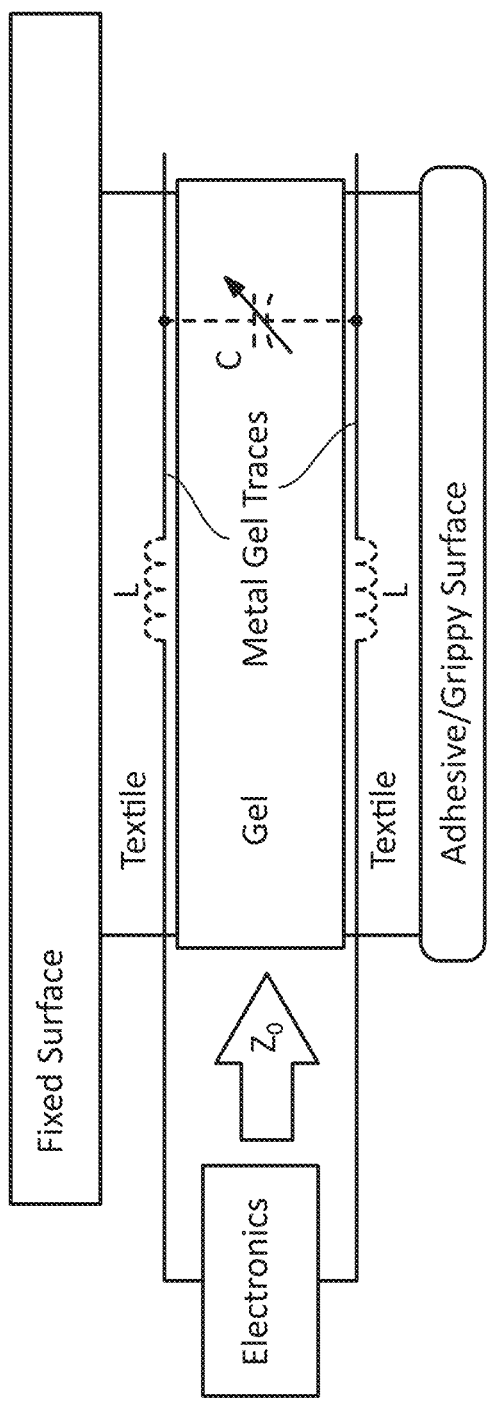
FIG. 17 is a cross-sectional view illustrating an embodiment of a device for sensing deformation using changes in characteristic impedance according to the inventive principles of this patent disclosure.

FIG. 17 is a cross-sectional view illustrating an embodiment of a device for sensing deformation using changes in characteristic impedance according to the inventive principles of this patent disclosure. The embodiment of FIG. 17 includes a dielectric gel sandwiched between two pieces of fabric, one of which may be attached to a fixed surface, and other of which may be attached to an adhesive or grippy surface. Traces made from metal gel other deformable conductor are patterned on both pieces of fabric such that they form a transmission line having a characteristic impedance $Z_0$. Each trace has an inductance L, and they form a mutual capacitance C. The inductances and capacitance are determined by the geometry of the traces and gel, as well as the dielectric constant of the gel. Deformations in the structure caused by compression, shear, etc., cause corresponding changes in the impedance $Z_0$ which may be sensed by electronics, thereby enabling the embodiment of FIG. 16 to function as a deformation sensor.

Figure 18:
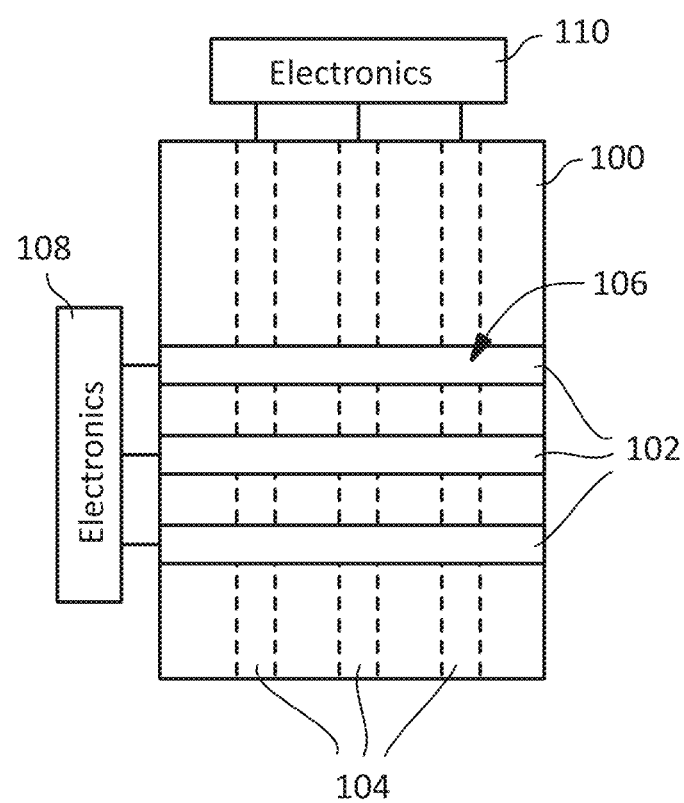
FIG. 18 is a plan view illustrating an embodiment of a device for capacitively sensing compression at various points of an array according to the inventive principles of this patent disclosure.

FIG. 18 is a plan view illustrating an embodiment of a device for capacitively sensing compression at various points of an array according to the inventive principles of this patent disclosure. The embodiment of FIG. 18 includes a grid array having horizontal traces 102 made from a deformable conductor patterned on a top surface of a soft elastomeric substrate 100 and vertical traces 104 made from a deformable conductor patterned on the opposite (bottom) surface of the substrate 100. Capacitive "pixels" 106 are formed by overlapping conductors at the intersections of the top and bottom traces. When a portion of the array is pressed, for example by a user's finger, the capacitance of the pixels in the pressed portion increases. Electronics 108 and 110 apply a suitable stimulus and decode and sense the capacitance of the pixels, thereby enabling detection of the location of the pressing action.

Figure 19:
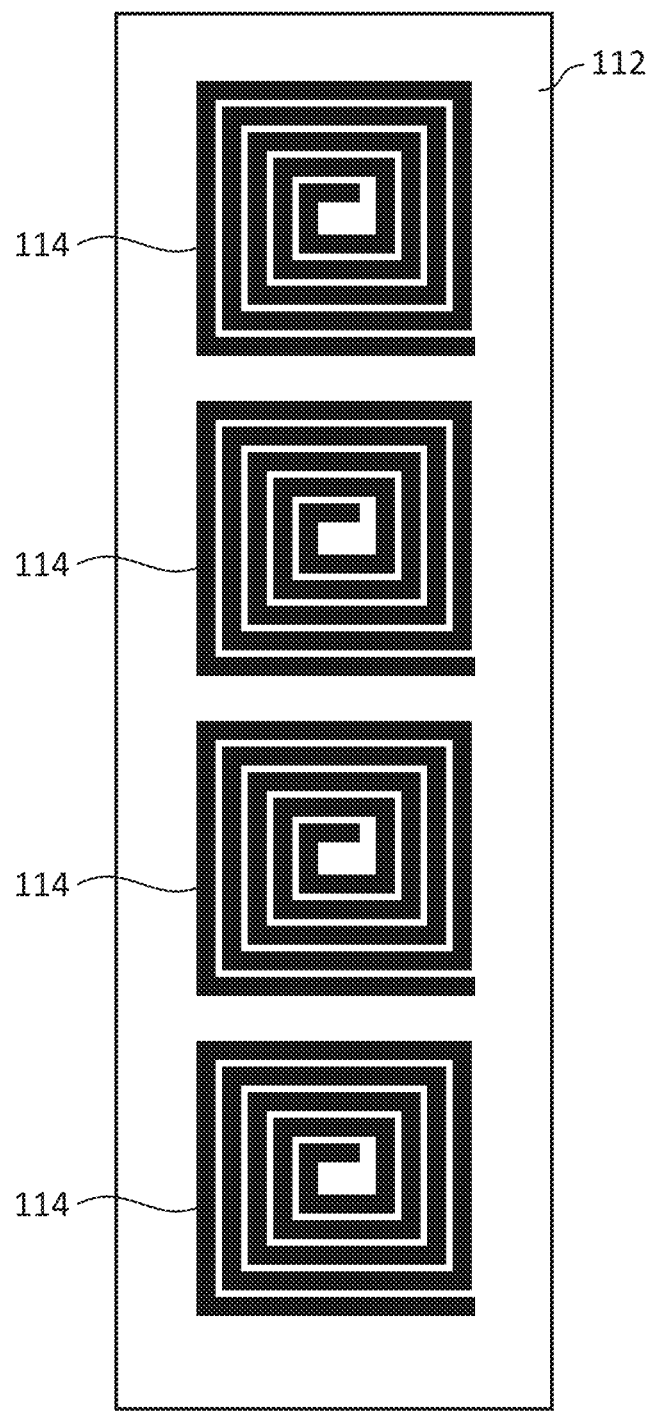
FIG. 19 is a plan view illustrating an embodiment of a device for inductive sensing according to the inventive principles of this patent disclosure.

FIG. 19 is a plan view illustrating an embodiment of a device for inductive sensing according to the inventive principles of this patent disclosure. The embodiment of FIG. 19 includes an array of inductive coils 114 made from a deformable conductor patterned on one side of a soft elastomer substrate 112. Suitable electronics may be coupled to the inductive coils to measure their self inductances, or their inductances or characteristic impedances relative to a ground plane or other coils that may be formed on the other side of the substrate. When the substrate is pressed or otherwise deformed, it causes a change in the inductance or impedance that may be used to corresponding deformation.

The deformation sensing systems described herein may be utilized with any suitable type of deformable conductor. This includes the gallium, gallium-indium gallium-indium-tin, etc., metal gels described above. However, the inventive principles relating to deformation sensing systems may also be realized with other deformable conductors including ionic fluids, conductive polymers, metal impregnated elastomers, carbon based conductors including those using graphene, carbon nanotube or other allotropes of carbon, mercury or mercury amalgams, etc.

Multiplexed Applications of Deformable Conductors

Some of the inventive principles of this patent disclosure relate to the use of multiplexing to perform multiple functions with a deformable conductor. One type of such a multiplexed system may include a deformable conductor and accompanying circuitry in which the deformation of the conductor causes a change in electrical signal properties of varying magnitude in one or more frequency domains which can be read separately due to the diplexing circuit. An example of such a system is described above with respect to the strain sensing and signal transmission system of FIG. 14 in which a DC signal is changed due to elongation of a deformable conductor which increases the resistance of the conductor. The change in resistance is detected by means of a voltage change using a Wheatstone bridge. Simultaneously, the diplexer circuit enables a high frequency RF signal to be sent along the conducting geometry for the purposes of data transmission. In this manner the traces fabricated from a deformable conductor may be used as both a transmission line and a strain feedback line.

In another type of multiplexed system, a deformable conductor such as a transmission line carrying an AC signal experiences a change in impedance when deformed. These impedance changes may be a function of AC current frequency. A diplexing circuit attached to the deforming circuit enables a high frequency signal and a low frequency signal may be sent over the deforming portion of the circuit simultaneously. One of the signals may be used to detect deformations and provide input to an active circuit which may dynamically tune the second frequency to match the deformations for purposes of transmitting maximum power or some other desirable end goal in the circuit.

In another example embodiment, a multiplexed system may act as both a transmission line and a sensing line in a deformable electronic device such as a robot component where it may function as both a 'nerve' (e.g., for transmitting information from a sensor to a processor or for transmitting instructions from a processor to an actuator) and as a sensor itself (e.g., for detecting degree of bend in an actuating element or for detecting a deforming force such as a pressure or shear).

In another example embodiment, a multiplexed elastic/fluid conductor may act as a sensor through its deformations in a soft good such as an article of clothing or upholstered furniture to provide biofeedback or other information about a user's body position, motion, etc., while also providing electrical functions such as transmitting power to peripheral devices, heating, signal transmission to external or internal data ports such as I2C, USB, SPI or any other current or future standard.

As a further example, in the same type of soft good the multiplexed elastic/fluid conductor may provide feedback on deformation for biofeedback or other purposes while being used to transmit RF data through antennas or transmission lines operating in the radio or microwave frequency range or while being used as wireless power transmission elements or as NFC communication and power transmission elements. A specific, but not limiting, example is an RFID tag which can be used to transmit information about a soft good article at an RF frequency while also acting as a pressure sensor under DC as its resistance appreciably changes due to deflection of the antenna trace pattern on a soft substrate when pushed. An RFID, NFC or Wireless charger may be activated for AC transmission through circuitry activated by means of a conductivity or impedance change at a DC or non-characteristic AC frequency due to deformation of the elastic/fluid conductor pattern.

Figure 20:
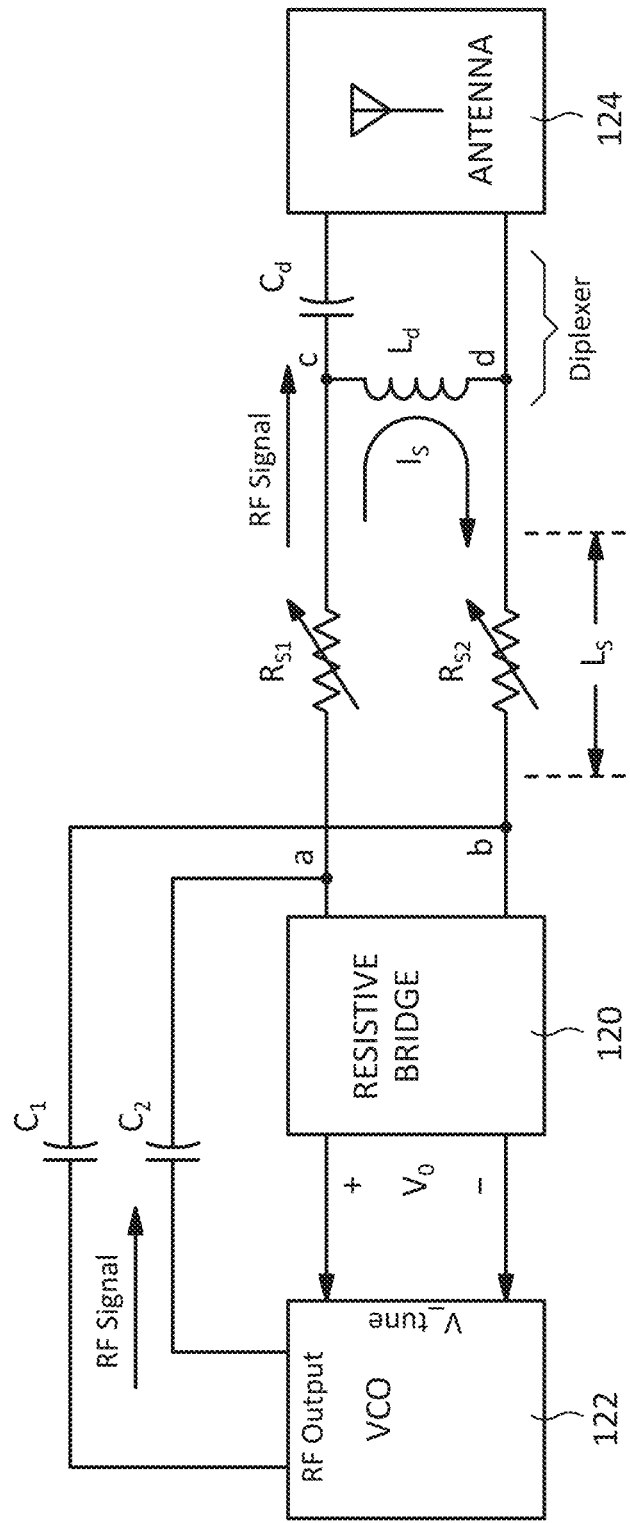
FIG. 20 illustrates an embodiment of a strain controlled oscillator that uses deformable conductors that function as both a strain sensor and transmission line according to some inventive principles of this patent disclosure.

Referring again to the multiplexed strain sensing and signal transmission system of FIG. 14, an example application of this type of system is shown in FIG. 20 which illustrates an embodiment of a strain controlled oscillator that uses deformable conductors that function as both a strain sensor and transmission line according to some inventive principles of this patent disclosure. In the embodiment of FIG. 20, the strain sensor is fabricated from two parallel deformable conductors shown as resistors $R_{S1}$ and $R_{S2}$, each having a length $L_S$. A diplexer includes an inductor $L_d$ which provides a DC current path for a sense current Is so resistors $R_{S1}$ and $R_{S2}$ are effectively connected in series for DC currents. The diplexer also includes an AC coupling (DC blocking) capacitor Cd that prevents the DC current $I_S$ from being coupled to antenna 124.

As the strain sensor is stretched, the resistances $R_{S1}$ and $R_{S2}$ increase in relation to the amount of stretch. A resistive bridge 120, which may be implemented as a Wheatstone bridge for example, senses the change in the resistances $R_{S1}$ and $R_{S2}$ by sensing the change in voltage at nodes a and b and/or the change in sense current Is, and converts this change in resistance to a change in output voltage $V_o$, which is then fed as the input tuning voltage V_tune to a voltage controlled oscillator (VCO) 122. The frequency of the RF output signal from the VCO is proportional to $V_o$, which is also proportional to the combined resistance of $R_{S1}$ and $R_{S2}$ and thus, is proportional to the length $L_S$ of the strain sensor. The RF output signal from the VCO is coupled to the strain sense lines through DC blocking capacitors $C_1$ and $C_2$ which prevent the RF signal from affecting the resistive bridge 120.

The RF signal then propagates down the transmission line formed by the deformable conductors and is coupled at nodes c and d to the antenna 124 through the AC coupling capacitor Cd. The antenna thus radiates an RF signal at a frequency that is determined by length $L_S$ of the sense lines $R_{S1}$ and $R_{S2}$. The radiated RF signal may be received with any suitable antenna and receiver and converted to strain data with microprocessor and/or any suitable apparatus arranged to operate as a frequency counter.

The multiplexed systems described herein may be utilized with any suitable type of deformable conductor. This includes the gallium, gallium-indium gallium-indium-tin, etc., metal gels described above. These metal compositions have conductivities on the order of $10^5$-$10^6$ Siemens/Meter which allow for signal transmission rates up to the MHz-GHz range over meters of distance while also providing linear strain feedback through resistance or inductance changes when deformed. However, the inventive principles relating to multiplexed systems may also be realized with other deformable conductors including ionic fluids, conductive polymers, metal impregnated elastomers, carbon based conductors including those using graphene, carbon nanotube or other allotropes of carbon, mercury or mercury amalgams, etc.

Figure 21:
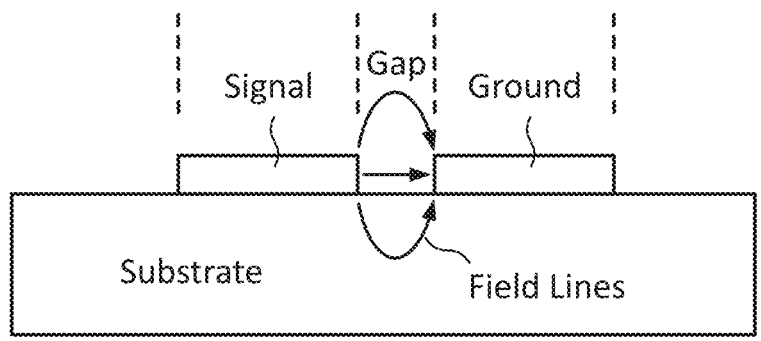
FIG. 21 is a cross-sectional view of a transmission line structure suitable for use with deformable conductors according to some inventive principles of this patent disclosure.

FIG. 21 is a cross-sectional view of a transmission line structure suitable for use with deformable conductors according to some inventive principles of this patent disclosure. The structure of FIG. 21 utilizes a slot-line structure and includes a signal line trace and a ground line trace patterned on a stretchable substrate and separated by a gap. In this example, the substrate may be ¼ inch thick silicon with dielectric constant of about 2.9. The entire structure may be encapsulated in another layer of silicon. This type of transmission line tends to have relatively unconstrained field lines and is difficult to achieve low impendences with. However, its simplicity typically makes it less expensive to fabricate so it would be advantageous to find a technique to use a slot line structure with deformable conductors on an stretchable substrate. The embodiment of FIG. 22 achieves this objective.

Figure 22:
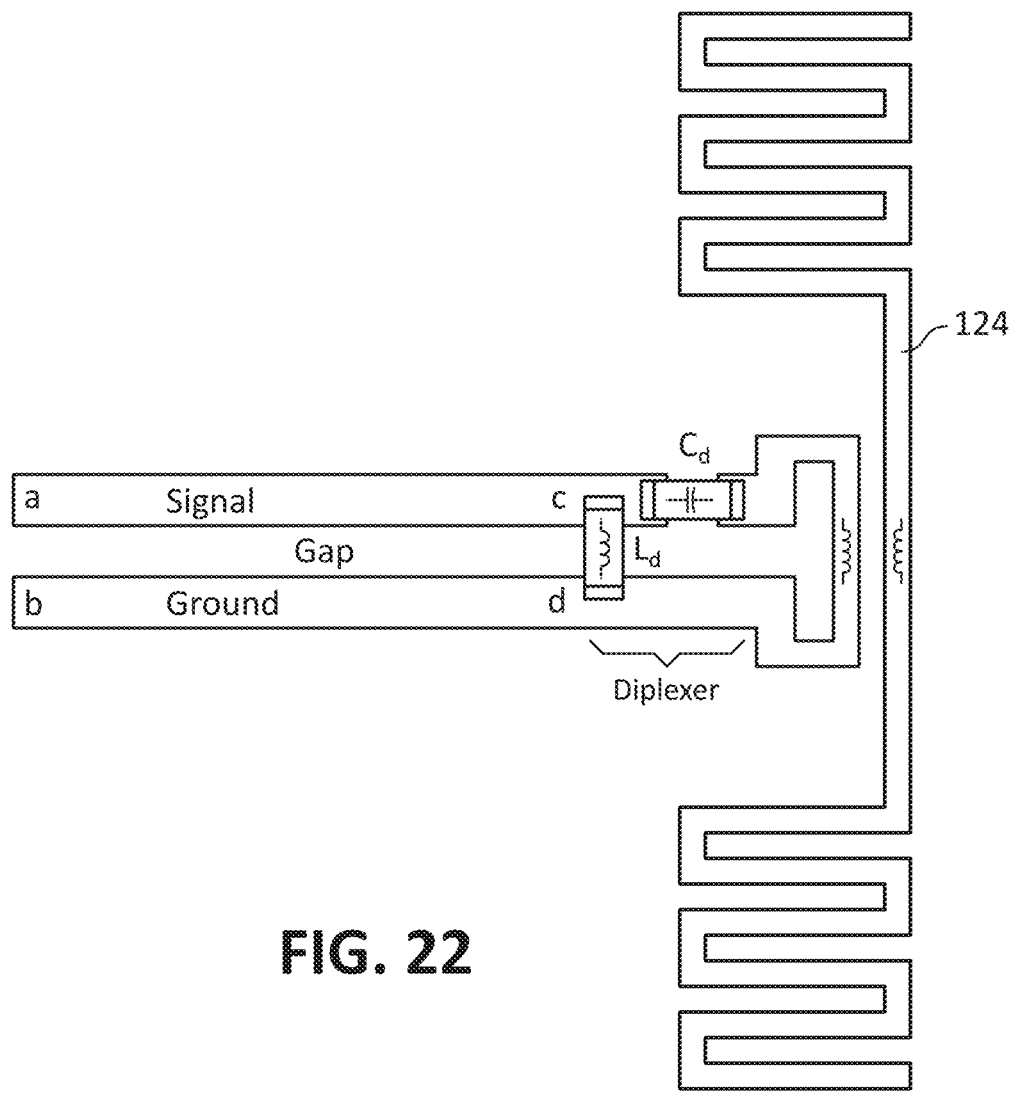
FIG. 22 is a plan view illustrating an embodiment of a diplexed strain sensor using a slot line structure according to some inventive principles of this patent disclosure.

FIG. 22 is a plan view illustrating an embodiment of a diplexed strain sensor similar that of FIG. 20 fabricated using the slot line structure of FIG. 21 for the strain measuring resistances $R_{S1}$ and $R_{S2}$. Nodes a, b, c and d in FIG. 22 correspond to the same nodes in FIG. 20. The antenna 124 is implemented as a folded dipole with inductive coupling. The entire structure is made with deformable conductors patterned on an elastomeric substrate. The elements illustrated in FIG. 22 are not shown to scale and may have exaggerated dimensions and proportions for purposes of illustration. The diplexer is implemented with a surface mount inductor $L_d$ and a surface mount capacitor $C_d$. The inductor $L_d$ is connected across the Signal and Ground traces at nodes c and d, while the capacitor $C_d$ is connected across a gap in the primary trace of the antenna. The surface mount components my be encapsulated in a less deformable material to prevent them from pulling away from the deformable conductors. Alternatively, a specially woven fabric or other less deformable material may be attached to the substrate under the inductor and capacitor to preserve the integrity of the electrical connection during deformation.

The embodiment of FIG. 22 may provide an effect low-cost implementation that may be especially suitable for use in where relatively higher transmission line impedances are used, for example, with dipole antennas having impedances above about 70 ohms.

Figure 23:
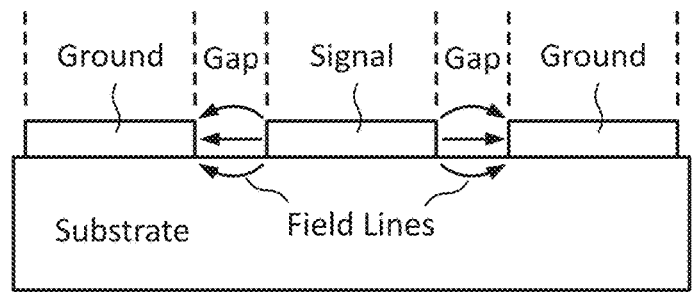
FIG. 23 is a cross-sectional view of another transmission line structure suitable for use with deformable conductors according to some inventive principles of this patent disclosure.

FIG. 23 is a cross-sectional view of another transmission line structure suitable for use with deformable conductors according to some inventive principles of this patent disclosure. The structure of FIG. 23 utilizes a coplanar waveguide (CPW) structure that typically has more constrained field lines and may achieve lower impedances through the use of a balanced (differential) structure that uses two separate ground traces.

Figure 24:
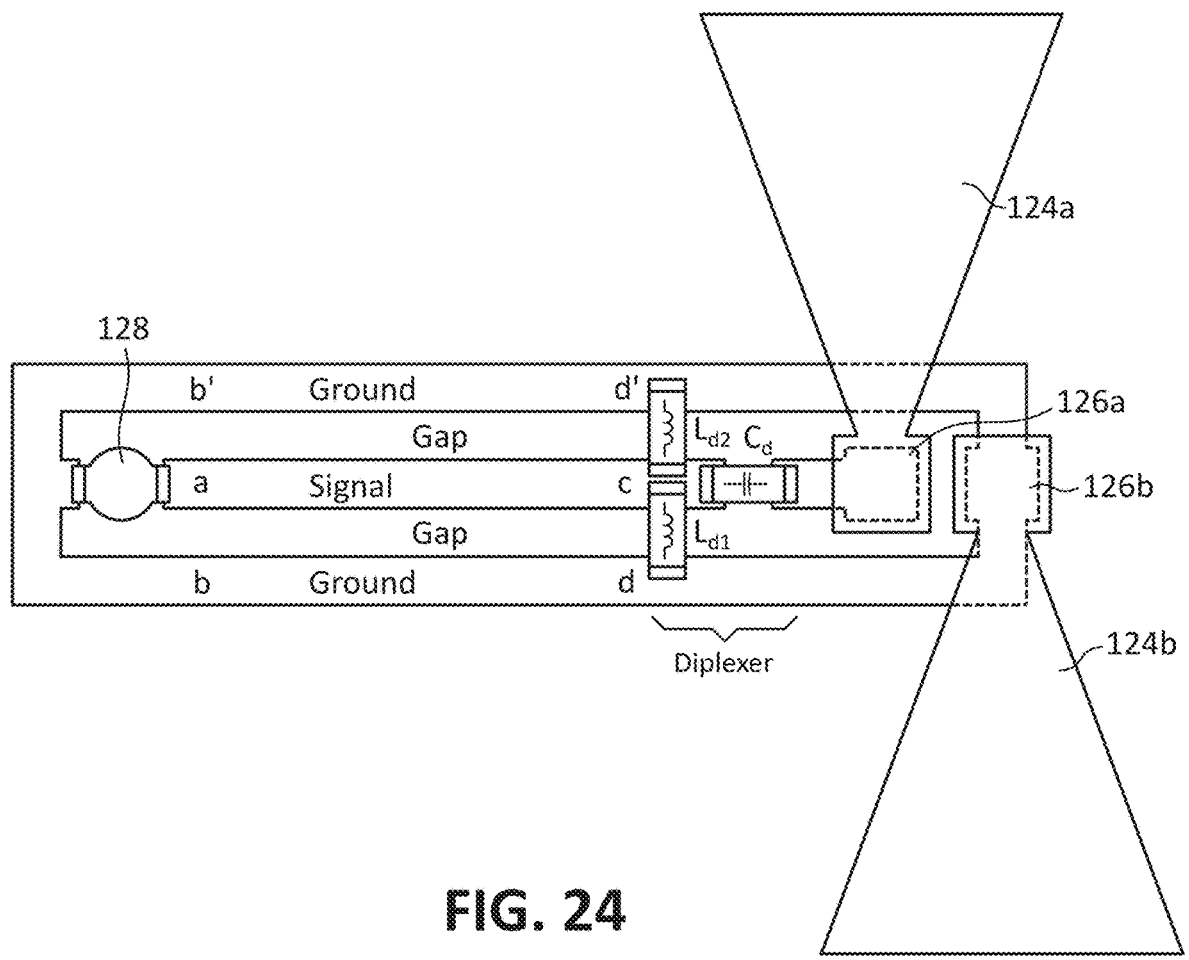
FIG. 24 is a plan view illustrating another embodiment of a diplexed strain sensor using a coplanar waveguide structure according to some inventive principles of this patent disclosure.

FIG. 24 is a plan view illustrating another embodiment of a diplexed strain sensor similar that of FIG. 20 fabricated using the coplanar waveguide structure of FIG. 23 for the strain measuring resistances $R_{S1}$ and $R_{S2}$. In this embodiment, the dual Ground traces result in nodes b' and d' that perform a similar function to nodes b and d, respectively. Because of the differential structure, the inductor $L_d$ is now split into two separate inductors $L_{d1}$ and $L_{d2}$. The Wheatstone bridge, VCO and other electronics are fabricated as a surface mount component 128 that may be mounted in the gap between traces and coupled to the deformable conductive traces in the same manner as the other surface mount components, $L_{d1}$, $L_{d2}$ and $C_d$. The electronics component 128 may also be encapsulated or otherwise protected from pulling away from the conductors as described above.

To accommodate the symmetry of the CPW transmission line, the antenna is fabricated on a separate layer from the other components and capacitively coupled to the transmission line through pads 126a and 126b which are shown in dashed lines to indicate that they are located beneath the antenna and separated by an insulating layer.

The antenna is implemented as a bow tie antenna for wideband performance, and each half of the antenna has a pad that is positioned over the corresponding pad that is coupled to the diplexer. The elements illustrated in FIG. 24 are not shown to scale and may have exaggerated dimensions and proportions for purposes of illustration. The embodiment of FIG. 24 may provide a high performance implementation that may be especially suitable for use in where relatively lower transmission line impedances are used, for example in applications where a 50 ohm transmission line is beneficial.

Figure 9:
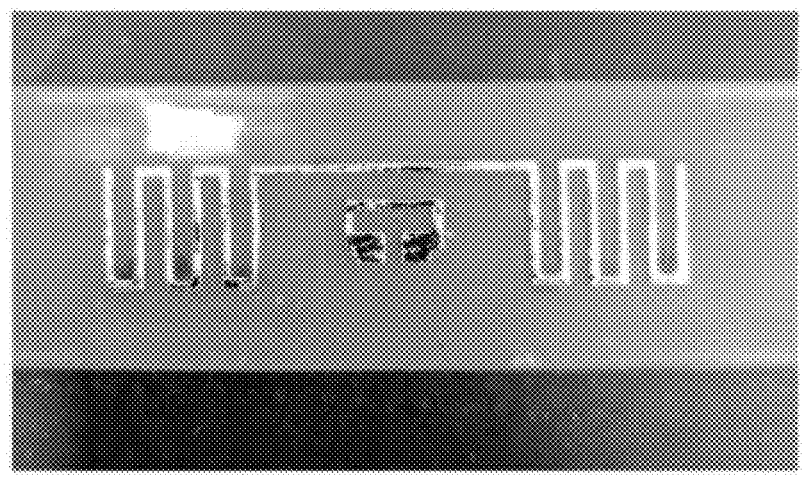
FIG. 9 is a digital image of a 990 MHz antenna printed from metal gel, in accordance with embodiments disclosed herein.
Figure 10:
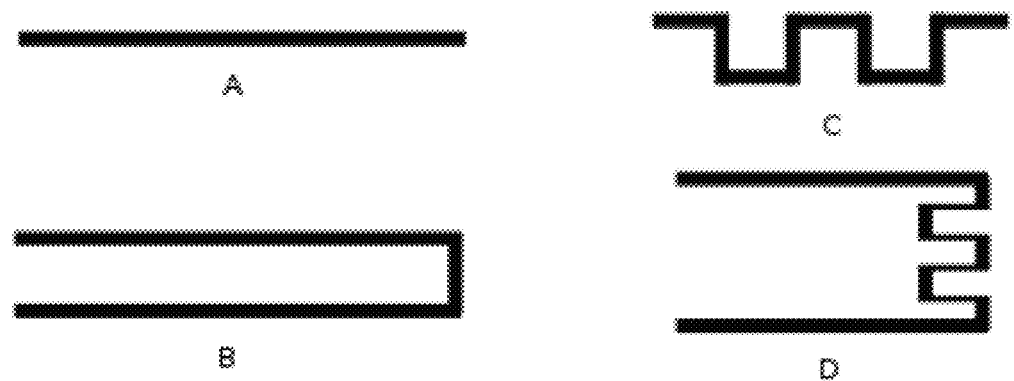
FIGS. 10A-10D are several examples of trace patterns. 10A) is a simple line which will act as a variable resistor changing with strain parallel to its path. 10B) has a return path to allow a signal to be read with i/o ports local to each other. The vertical connecting bar will provide negligible resistance change for strain measured parallel to the main traces. 10C) A zigzag pattern will multiply the resistance/strain feedback for strain perpendicular to the direction of the trace. 10D) a trace with a return path and resistance/strain feedback multiplier on the horizontal portion. This trace will be sensitive to strain parallel to its orientation, but not perpendicular.
Figure 25:
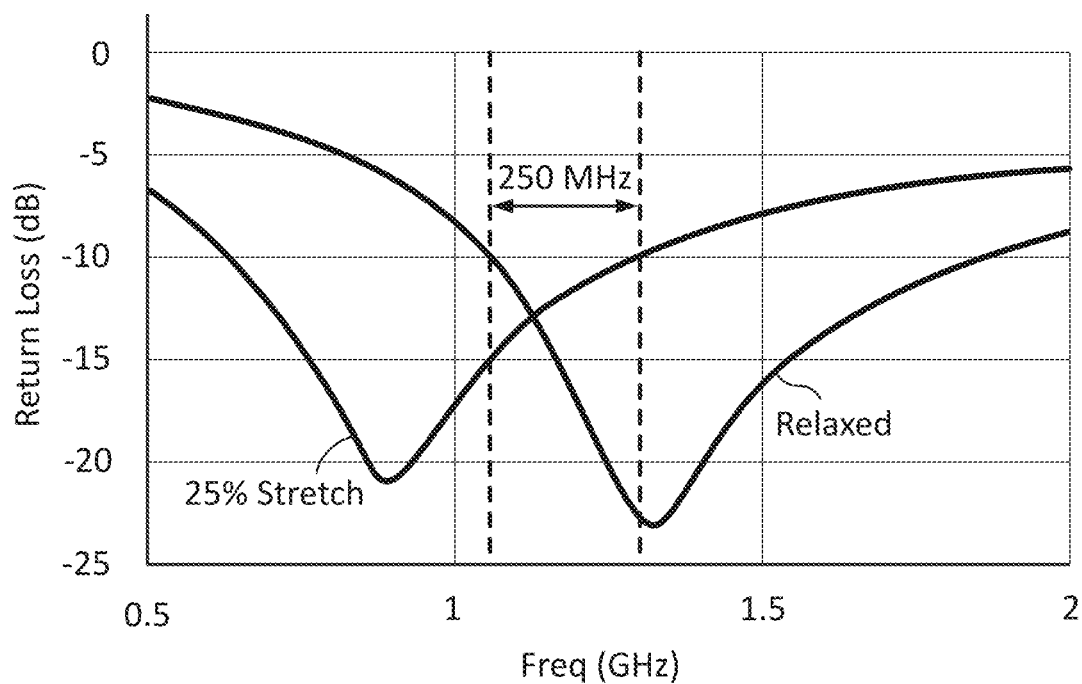
FIG. 25 illustrates the return loss versus stretch for a bow tie antenna fabricated with metal gel according to the inventive principles of this patent disclosure.
Figure 26:
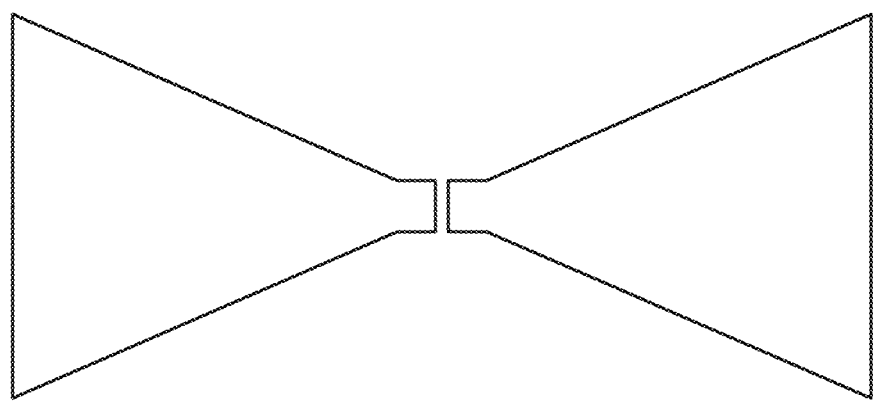
FIG. 26 illustrates a bow tie antenna structure according to some inventive principles of this patent disclosure.

As discussed above, e.g., with respect to FIG. 9, deformable conductors formulated according to the inventive principles of this patent disclosure may enable the fabrication of antennas that retain their function even when subjected to large deformations. FIG. 25 illustrates the return loss versus stretch for a bow tie antenna fabricated with metal gel according to the inventive principles of this patent disclosure. The right trace shows the return loss as a function of frequency when the antenna is in the relaxed (undeformed) state, while the left trace shows the return loss as a function of frequency when the antenna is stretched 25 percent. As can be seen from FIG. 25, the return loss is better than 10 dB (i.e., less than ten percent of the incident power is reflected) over a 250 MHz bandwidth even when the antenna is stretched between zero and 25 percent. The approximate geometry of the tested antenna is shown in FIG. 26.

Since the inventive principles of this patent disclosure can be modified in arrangement and detail without departing from the inventive concepts, such changes and modifications are considered to fall within the scope of the following claims.

The invention claimed is:

1. A conducting composition, comprising:
   a eutectic gallium alloy; and
   sub-micron scale gallium oxide particles;
   wherein the mixture of eutectic gallium alloy and gallium oxide has a weight percentage (wt %) of between about 59.9% and about 99.9% eutectic gallium alloy; and
   wherein the composition is a gel stabilized by the gallium oxide particles, and exhibits a non-Newtonian behavior.

2. The conducting composition of claim 1, further comprising one or more micro-particles or sub-micron scale loading particles dispersed within the mixture, where the loading particles have a wt % of between about 0.001% and about 40.0% of micro-particles in the composition.

3. The conducting composition of claim 1, wherein the composition exhibits a shear-thinning behavior.

4. The conducting composition of claim 1, wherein the gallium oxide has a wt % of between about 0.1% and about 2.0%.

5. The conducting composition of claim 1, wherein the sub-micron scale gallium oxide particles are interlinked.

* * * * *